(12) United States Patent
Smith et al.

(10) Patent No.: US 10,069,868 B2
(45) Date of Patent: Sep. 4, 2018

(54) SYSTEMS AND METHODS TO FACILITATE MULTI-FACTOR AUTHENTICATION POLICY ENFORCEMENT USING ONE OR MORE POLICY HANDLERS

(71) Applicant: Intel Corporation, Santa Clara, CA (US)

(72) Inventors: Ned M. Smith, Beaverton, OR (US); Abhilasha Bhargav-Spantzel, El Dorado Hills, CA (US); Micah James Sheller, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 842 days.

(21) Appl. No.: 14/229,200

(22) Filed: Mar. 28, 2014

(65) Prior Publication Data

US 2015/0281279 A1    Oct. 1, 2015

(51) Int. Cl.
*G06F 17/00* (2006.01)
*H04L 29/06* (2006.01)

(52) U.S. Cl.
CPC ............. *H04L 63/20* (2013.01); *H04L 63/08* (2013.01); *H04L 2463/082* (2013.01)

(58) Field of Classification Search
CPC ... H04L 63/0823; H04L 63/12; H04L 9/3247; H04L 9/3263; H04L 2209/38; H04L 9/3281
See application file for complete search history.

(56) References Cited

U.S. PATENT DOCUMENTS

| 5,867,578 A  * | 2/1999  | Brickell ................. G06F 21/40 380/286 |
| 5,970,227 A    | 10/1999 | Dayan et al. |
| 8,566,571 B2   | 10/2013 | Beachem et al. |
| 8,843,108 B1   | 9/2014  | Lish et al. |
| 9,130,937 B1 * | 9/2015  | Ostermann ......... H04L 63/0227 |

(Continued)

FOREIGN PATENT DOCUMENTS

WO    2012173626    12/2012

OTHER PUBLICATIONS

United States Patent and Trademark Office, "Non-Final Office Action," issued in connection with U.S. Appl. No. 14/628,016, dated Apr. 28, 2016 (17 pages).

(Continued)

*Primary Examiner* — Catherine B Thiaw
*Assistant Examiner* — Quy C Pham
(74) *Attorney, Agent, or Firm* — Hanley, Flight & Zimmerman, LLC

(57) ABSTRACT

Methods, apparatus, systems and articles of manufacture are disclosed to facilitate multi-factor authentication policy enforcement using one or more policy handlers. An example first policy handler to manage a global policy in a distributed environment includes a parser to identify a first sub-policy of the global policy that is capable of enforcement by the first policy handler, and an attester to sign the first sub-policy. The example first policy handler further includes a director to determine whether to forward the global policy to a second policy handler based on a signature status of the global policy, and to forward the global policy to the second policy handler when the signature status of the global policy is indicative of an unsigned second sub-policy.

20 Claims, 9 Drawing Sheets

(56) References Cited

U.S. PATENT DOCUMENTS

| | | | |
|---|---|---|---|
| 2002/0112155 A1 | 8/2002 | Martherus et al. | |
| 2002/0138726 A1 | 9/2002 | Sames et al. | |
| 2003/0018786 A1 | 1/2003 | Lortz | |
| 2003/0115484 A1 | 6/2003 | Moriconi et al. | |
| 2005/0033813 A1* | 2/2005 | Bhogal | G06F 17/24 709/206 |
| 2005/0283443 A1* | 12/2005 | Hardt | H04L 63/0815 705/67 |
| 2006/0021003 A1 | 1/2006 | Fisher et al. | |
| 2006/0156385 A1 | 7/2006 | Chiviendacz et al. | |
| 2007/0143827 A1* | 6/2007 | Nicodemus | G06F 21/6218 726/2 |
| 2007/0157319 A1 | 7/2007 | Kammer et al. | |
| 2007/0234408 A1 | 10/2007 | Burch et al. | |
| 2008/0086770 A1 | 4/2008 | Kulkarni et al. | |
| 2008/0148387 A1 | 6/2008 | Madina et al. | |
| 2009/0187962 A1 | 7/2009 | Brenneman et al. | |
| 2009/0327675 A1 | 12/2009 | Cherian et al. | |
| 2010/0042824 A1 | 2/2010 | Lee et al. | |
| 2010/0153696 A1 | 6/2010 | Beachem et al. | |
| 2010/0205316 A1 | 8/2010 | Xue et al. | |
| 2011/0154434 A1 | 6/2011 | Hernacki | |
| 2012/0011559 A1 | 1/2012 | Miettinen et al. | |
| 2012/0032945 A1 | 2/2012 | Dare et al. | |
| 2014/0075493 A1 | 3/2014 | Krishnan et al. | |
| 2014/0137101 A1 | 5/2014 | Chan et al. | |
| 2014/0187200 A1 | 7/2014 | Reitter et al. | |
| 2015/0117198 A1* | 4/2015 | Menezes | H04L 47/20 370/235 |
| 2015/0248566 A1 | 9/2015 | Scott-Nash et al. | |
| 2016/0087957 A1* | 3/2016 | Shah | H04L 63/205 726/1 |

OTHER PUBLICATIONS

International Searching Authority, "International Search Report and Written Opinion," issued in connection with International Patent Application No. PCT/US2016/013786, dated May 17, 2016 (14 pages).

Intel, "Software Guard Extensions Programming Reference," Sep. 2013, 156 pages. (NPL in 4 parts).

Ben-Shalom et al., "Granular Trust Model Improves Enterprise Security," Nov. 2012, 8 pages, Intel.

Ben-Shalom et al., "Rethinking Information Security to Improve Business Agility," Jan. 2011, 8 pages, Intel.

Unpublished U.S. Appl. No. 14/472,645, filed Aug. 29, 2014.

IEEE 1667 Working Group, "IEEE 1667 Introduction and Overview: Standard for Discovery, Authentication, and Authorization in Host Attachments of Storage Devices," Mar. 29, 2013, 28 pages.

Patent Cooperation Treaty, "International Search Report," issued in connection with International Patent Application No. PCT/US2015/016804, dated May 27, 2015, 4 pages.

Patent Cooperation Treaty, "Written Opinion" issued in connection with International Patent Application No. PCT/US2015/016804, dated May 27, 2015, 5 pages.

Anati et al., "Innovative Technology for CPU Based Attestation and Sealing," Intel Corporation, 2013 (7 pages).

Hoekstra et al., "Using Innovative Instructions to Create Trustworthy Software Solutions," Intel Corporation, 2013 (8 pages).

McKeen et al., "Innovative Instructions and Software Model for Isolated Execution," Intel Corporation, 2013 (8 pages).

Wikipedia, "IEEE 802.11i-2004," Jul. 6, 2014, retrieved from <http://en.wikipedia.org/wiki/IEEE_802.11i-2004>, retrieved on Aug. 6, 2014 (5 pages).

Chen et al., "Certifying Program Execution with Secure Processors," MIT Lab, USENIX, 2003 (8 pages).

Patent Cooperation Treaty, "International Preliminary Report on Patentability," issued in connection with international application No. PCT/US2015/016804, dated Oct. 4, 2016 (6 pages).

International Searching Authority, "International Preliminary Report on Patentability," issued in connection with International Patent Application No. PCT/US2016/013786, dated Aug. 31, 2017 (11 pages).

United States Patent and Trademark Office, "Non-final Office Action," issued in connection with U.S. Appl. No. 14/628,016, dated Nov. 29, 2017, 21 pages.

European Patent Office, "Extended European Search Report," issued in connection with European Patent Application No. 15769806.9, dated Oct. 10, 2017, 5 pages.

United States Patent and Trademark Office, "Final Office Action," issued in connection with U.S. Appl. No. 14/628,016, dated Feb. 6, 2017, 17 pages.

United States Patent and Trademark Office, "Final Office Action," issued in connection with U.S. Appl. No. 14/628,016, dated May 31, 2018, 16 pages.

Korean Intellectual Property Office, "Notice of Preliminary Rejection," issued in connection with Korean Patent Application No. 2016-7023302, dated Jun. 21, 2018, 12 pages.

* cited by examiner

SYSTEMS AND METHODS TO FACILITATE MULTI-FACTOR AUTHENTICATION POLICY ENFORCEMENT USING ONE OR MORE POLICY HANDLERS

FIELD OF THE DISCLOSURE

This disclosure relates generally to computing security, and, more particularly, to systems and methods to facilitate multi-factor authentication policy enforcement using one or more policy handlers.

BACKGROUND

In recent years, security of clients has proven to be a weak link in the current client-server model. Current client-server models typically include an enterprise server that administers an authentication policy and one or more client nodes that enforce the authentication policy locally on each client node. A user may request access to resources via a client node by first authenticating themselves. Security credentials, such as a username and a corresponding password, have been used for decades but are fraught with usability challenges now that users are expected to manage dozens, if not hundreds, of passwords. An alternate or additional solution involves using biometrics, wearables and/or touch-sensitive input devices to authenticate users.

DETAILED DESCRIPTION

Figure 1:
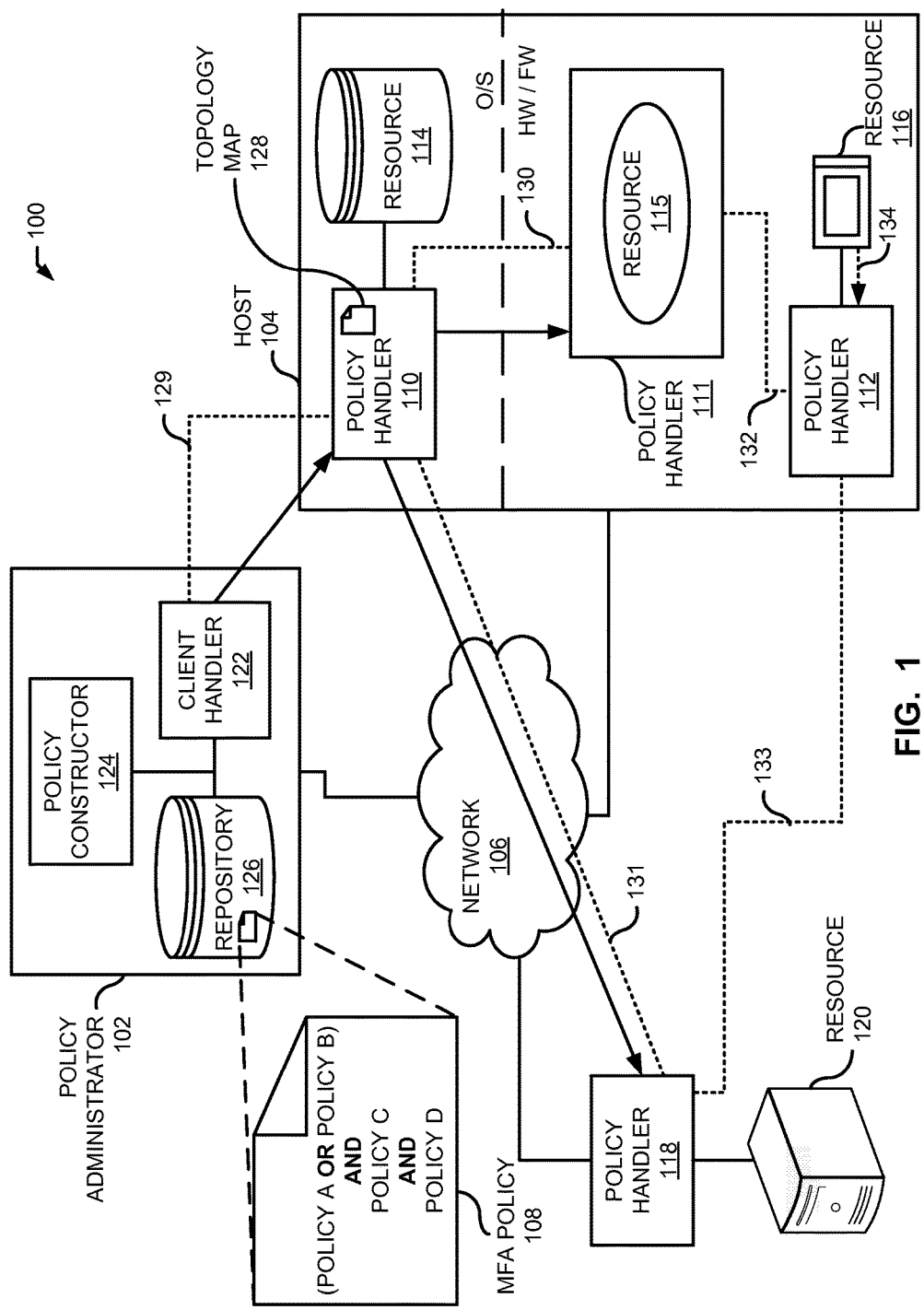
FIG. 1 is a schematic illustration of an example distributed computing environment constructed in accordance with the teachings of this disclosure to facilitate multi-factor authentication policy enforcement.

Systems methods, apparatus and/or articles of manufacture disclosed herein facilitate the management of a multi-factor authentication policy in a client environment using one or more policy handlers distributed in the client environment. Multi-factor authentication (MFA) is an additional or alternative user authentication approach to simple passwords. A system that enforces multi-factor authentication may require multiple security credentials such as username/password, biometrics, wearables, and/or touch-sensitive input devices before the user is able to access the requested controlled resource. An MFA policy (sometimes referred to as a "global policy") is a collection of sub-policies (e.g., factors, such as security credentials, contextual requirements, etc.) that may be combined using, for example, logical AND and/or logical OR operators. For example, compliance of an MFA policy including two policies may be determined by satisfying (1) a first factor corresponding to sensor input from a fingerprint reader, OR (2) a second factor corresponding to sensor input from a camera AND a third factor corresponding to a username/password combination. Managing an MFA policy in a client environment includes provisioning (e.g., deploying, providing, etc.) the MFA policy to the client environment, and then enforcing the MFA policy when access to a resource under the control of the client environment is requested. In some examples, the sub-policies pertain to different level(s) or type(s) of authenticating a user who is requesting access to a controlled resource. The sub-policies process their security credentials (e.g., something the user knows such as a username/password combination, something the user has such as a smart card, and/or something the user exhibits such as biometric characteristics) based on different strength levels. For example, policies or sub-policies to verify security credentials may include a first sub-policy to check whether input from a sensor satisfies a threshold for compliance, a second sub-policy to check whether the sensor satisfies minimum security strength criteria, and a third sub-policy to check whether the security credentials were obtained at a trusted sensor. Thus, a policy and/or a sub-policy may include additional sub-policies. For instance, in the example above, a first policy or sub-policy may require a fingerprint scan to match an authorized fingerprint signature. The first policy or sub-policy may include a second sub-policy to check the security strength level of the fingerprint reader, and a third sub-policy to check whether the fingerprint reader is a trusted fingerprint reader. In some such examples, the first policy or sub-policy may be tested only if the second and third sub-policies are first deemed compliant. As used herein, a controlled resource may be any file, folder, peripheral device, sensor, key, service or entity that has one or more associated access control restrictions and/or rules. A controlled resource may be processed by different rules for different persons. For example, a first user may have read-only permission when accessing a file, while a second user may have full control (e.g., read and/or write) permission when accessing the same file.

In some examples disclosed herein, a policy administrator provides the MFA policy to policy handlers distributed in the client environment. In such examples, the MFA policy is provisioned and enforced by the policy handlers. In some examples, a policy handler is implemented by software such as an operating system and/or hardware/firmware components such as sensors that interface with a user to perform an authentication (e.g., a keyboard to provide username/password combination credentials), perform a liveliness test (e.g., a camera to provide retina scan credentials) or perform user presence sampling (e.g., an NFC-enabled device to provide proximity credentials). In some examples, policy hardening strategies are applied to the policy handlers. Hardening includes the process of securing a system by reducing its vulnerabilities to, for example, unauthorized malware. Example policy hardening strategies include mechanisms that isolate input/output, processing and/or memory of the host and/or client environment. These controlled resource isolation mechanisms may sometimes be referred to as a Trusted Execution Environment (TEE). In examples disclosed herein, a policy handler may execute in a trusted execution environment. In general, a policy handler is able to attest to its authenticity (sometimes referred to as "attestation"), thereby assuring that messages (e.g., controlled resource access requests, sensor inputs, etc.) obtained from that policy handler may be processed as an authentic message.

In some examples, different technologies may be used to implement the policy handlers in a client environment. For example, Intel® technologies include the "Manageability Engine (ME)," the "Converged Security Engine (CSE)," the "Secure Element Component (SEC)," the "Chaabi," the "Software Guard Extensions (SGX)," the "Virtualization Technology (VT-X)," and/or the "Trusted Execution Technology (TXT)." In some examples, "TrustZone" technology, defined by ARM architecture, may be used in conjunction with ARM architecture defines TrustZone technology which may be used in conjunction with Google® "Trusty" operating systems. Still, in other examples, a cloud server running a variety of trusted OS systems may be used (e.g. SE-Linux).

In some examples, a set or subset of different TEE technologies may be used to construct a hierarchy of policy handlers based on, for example, different levels of security strength (e.g., policy hardness) and/or functionality of the policy handler and/or sensor in communication with the policy handler. For example, a first layer of policy handlers (e.g., layer 1 policy handlers) may correspond to peripheral devices (e.g., keyboards, fingerprint readers, cameras, etc.) that apply a first security strength, a second layer of policy handlers (e.g., layer 2 policy handlers) may correspond to manageability engines that apply a second security strength, and a third layer of policy handlers (e.g., layer 3 policy handlers) may correspond to operating systems that apply a third security strength. In such examples, the hierarchy of policy handlers may order the first layer policy handlers (sometimes referred to herein as "leaf nodes") at one end of the hierarchy, the third layer policy handlers (sometimes referred to herein as "root nodes") at the other end of the hierarchy, and the second layer policy handlers (sometimes referred to herein as "intermediate nodes") between the first layer policy handlers and the third layer policy handlers. In some examples, the functionality type and the security strength of the policy handler may depend on the component(s) (e.g., software, hardware and/or firmware) of the policy handler.

In some examples, the MFA policy is provisioned hierarchically through the policy handlers in the client environment. For example, a primary policy handler may map subordinate policy handlers and use the mapped client topology to distribute the MFA policy. As used herein, a primary policy handler is a policy handler with a direct path of communication (e.g., communicates directly with the policy administrator without the use of intermediary policy handlers). A subordinate policy handler is a policy handler with an indirect path of communication to the policy administrator (e.g., communicates with the policy administrator via the primary policy handler (and possibly via one or more other policy handlers). However, depending on the application and configuration, any of the policy handlers in the client environment (e.g., one or more first layer policy handlers, one or more second layer policy handlers, and/or one or more third layer policy handlers) may be designated as a primary policy handler. The policy handlers may be locally and/or remotely distributed in the client environment. For example, the client topology map may map (e.g., establish communication paths with) all of the policy handlers to a single platform or host, map all of the policy handlers to a cloud service, and/or map different sets and/or subsets of the policy handlers to any combination of host(s) and/or cloud service(s). In some examples, the topology map also includes the functionality type and/or the security strength of each of the policy handlers.

In some examples disclosed herein, each policy handler decides (e.g., locally decides) how to provision the MFA policy. For example, when the MFA policy is being provisioned, a policy handler accesses the MFA policy, parses the MFA policy to identify one or more sub-policies of the MFA policy capable of enforcement by the policy handler, and signs that sub-policy as claimed by the policy handler. In some examples, the policy handler claims the sub-policy by signing the sub-policy (e.g., appending a private key unique to the policy handler) to identify which sub-policy (or sub-policies) the policy handler will enforce. In some examples, the policy handler claims the sub-policy when the policy handler matches the functionality requirement of the sub-policy and is capable of applying the minimum security strength criteria required by the sub-policy. For example, a sub-policy to enforce a location policy cannot be claimed by a policy handler that does not have access to a location-based sensor (e.g., a global positioning system sensor).

In some examples, the policy handler may use entailment evidence to prove its credentials when claiming a sub-policy. For example, entailment evidence (e.g., a chain of trust) may specify or identify a method or composition of communication paths such that an independent review of the entailment can be used to determine the trustworthiness features of the communication path. Entailments may refer to a chain-of-trust evidence such as one or more manufacturer certificates, one or more signed code, one or more authenticodes, one or more manifests, one or more "bills of material," and/or whitelists. Entailment may be expressed as an enumeration mechanism such as a string, a uniform resource identifier, an object identifier, etc. For example, a level 1 sub-policy may identify a minimum firmware version for the sensor before the associated policy handler can claim that sub-policy. The policy handler may then provide its entailment to justify its claim to the sub-policy.

The policy handler may then forward the MFA policy, including the claimed sub-policy, to another policy handler in the client environment. In this manner, the MFA policy is provisioned (e.g., distributed) to the policy handlers in the client environment. In some examples, the policy handler employs the topology map of the client environment when forwarding the MFA policy. For example, the policy handler may identify one or more policy handlers that it is connected with and forward the MFA policy accordingly. Additionally or alternatively, the policy handler may identify unsigned sub-policies in the MFA policy and forward the MFA policy to policy handlers that are capable of enforcing one or more of the unsigned sub-policies. For example, the policy handler may determine the functionality requirement and minimum security strength criteria defined by an unsigned sub-policy and identify a policy handler that satisfies the functionality requirement and minimum security strength criteria. The example policy handler may then employ the topology map to generate an execution plan based on the connection paths used to forward the MFA policy.

MFA policy administration also includes enforcing the MFA policy when a request for a controlled resource (e.g., a protected resource) is obtained. Examples disclosed herein enforce the MFA policy by determining whether the sub-policies of the MFA policy are satisfied. In other words, the policy handlers of disclosed examples evaluate whether the particular sub-policy (or sub-policies) that they claimed are satisfied and use the results of the evaluation(s) to determine whether to grant or deny access to the requested controlled resource. In some examples, evaluating a sub-policy includes comparing a first sensor input to a second sensor input, comparing the first sensor input against known, authorized input values, applying a Boolean check on the first sensor input, etc. In some examples, if an evaluating policy handler determines it is not the appropriate policy handler to evaluate the sub-policy (e.g., does not satisfy the functionality requirement and/or minimum security strength criteria), the policy handler forwards the security credentials to another policy handler to process. In this manner, the MFA policy is enforced by the policy handlers in the client environment. When the MFA policy is satisfied (e.g., a successful evaluation occurs), access to the requested controlled resource is granted. In some examples, if the MFA policy is not satisfied (e.g., the security credentials fail at least one sub-policy (e.g., the logical combination of factors did not result in a true statement)), access to the requested controlled resource is denied. In some examples, the result of the controlled resource access request may be provided to the other policy handlers in the client environment. In some examples, changes in status of the controlled resource access request decision may also be signaled to other policy handlers. For example, if a controlled resource is idle for a threshold amount of time, access to the controlled resource may be revoked.

One or more sensors in the client environment are employed in some examples to provide security credentials associated with users. In some examples, sensors monitor the system state of the platform (e.g., hardware, firmware and/or operating system) of the host. For example, system sensors may determine the time of day, day of week, physical or logical location of the host, whether the host is moving, platform temperature and/or other characteristics of the client environment. In some examples, the logical location may be estimated within an approximate connectivity range for a respective technology. For example, an Ethernet switch containing a manage port or a Wi-Fi router with manageability can report the switch or router location such that the endpoint system location can be estimated. In some such examples, system sensors are used to construct probabilistic models that correlate users to one or more system states (e.g., logged in, authorized access, rejected access, revoked access, etc.).

In some examples, input from sensors in communication with the client environment provide added context used to make context-based decisions. For example, inputs from some sensors such as NFC radios may detect transmissions unique to a specific user. For sensors such as the NFC radio, there is a high probability that the intended user is carrying the transmitter. For example, a wristwatch or smart phone could transmit a unique value over an NFC channel to the NFC radio. In some examples, a Bluetooth Low Energy ("BLE") radio may be used as an alternative to the NFC radio. The BLE has similar security properties to NFC, but comprises a relatively longer communication range than NFC. For example, BLE can be measured in multi-meter range, while NFC may only have a communication range of millimeters. Infrared and/or ultrasonic signals can be measured in a range of centimeters and may not require that a user carry a pairing device (e.g. a radio). For example, an infrared sensor including an emitter may broadcast a light beam and the infrared sensor may absorb reflected infrared light, thereby sensing the presence of an object presumed to be a user that has been recently authenticated. In some examples, a microphone array senses voice patterns that remain consistent with regard to a user that recently authenticated and/or may uniquely identify a user based on a sensed voice print. In still other examples, a camera uses object and pattern recognition to identify a user. Other sensor inputs could be additionally or alternatively included, such as an accelerometer or global positioning system.

In some examples, an MFA policy or sub-policy includes requirements for the policy handlers to satisfy before the policy handlers evaluate claimed sub-policies. For example, a sub-policy may specify execution metrics (e.g., power, latency, computation, etc.) that the example policy handler uses to improve MFA policy enforcement. For example, if a sensor can deliver a more accurate reading of user presence at a higher power level, the policy handler controlling the sensor may cause the sensor to transition to the higher power level while processing user presence and return to the previous power level once done processing user presence.

FIG. 1 is a schematic illustration of an example client environment 100 in which multi-factor authentication policies are administered using policy handlers distributed in the client environment 100. The example client environment 100 of FIG. 1 includes a policy administrator 102 and a host 104. In the illustrated examples, the policy administrator 102 is implemented using one or more devices. Similarly, the host 104 (sometimes referred to as a "host machine," "client platform," "client node" or "computing device") is implemented using one or more devices. For example, the policy administrator 102 and/or the host 104 may include disk arrays and/or one or more workstations (e.g., desktop computers, workstation servers, laptops, x86 devices, Linux devices, etc.) in communication with one another. In the illustrated example of FIG. 1, the policy administrator 102 is in selective communication with the host 104 via one or more wired and/or wireless networks represented by network 106. Example network 106 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic intervals, scheduled intervals, manual intervals, aperiodic intervals and/or one-time events.

In the illustrated example of FIG. 1, the policy administrator 102 is implemented by a server and/or database that enables centralized management of authorization services and facilitates tracking and control of resources (e.g., controlled resources) in the client environment 100. In some examples, the policy administrator 102 is a manageability console or host application to author and/or provision (e.g., make available to or provide) one or more MFA policies and/or sub-policies (e.g., example MFA policy 108). In some examples, the policy administrator 102 is implemented by a policy administration plug-in. For example, the policy administrator 102 may be implemented by a policy administration plug-in for a security and/or manageability console executed by a policy server. In some examples, the policy administrator 102 includes one or more interfaces that enable users to manage MFA policies to apply in the client environment 100. For example, the policy administrator 102 may include an interface that enables a user (e.g., an information technology (IT) administrator, a system administrator, an entity, a business, an organization, etc.) to store MFA policies and/or sub-policies in an example repository 126 in communication with the policy administrator 102. The example MFA policies may be used to control access to and/or prioritize access for controlled resources accessible via the host 104.

In the illustrated example of FIG. 1, the MFA policy 108 is a collection of sub-policies (e.g., policy A, policy B, policy C, policy D) combined together by Boolean logic. For example, the MFA policy 108 may define a set of security credentials (e.g., factors) that, when provided, allow access to a controlled resource. Equation 1 below is an example representation of an example implementation of the example MEA policy 108.

$$P=(A\|B)\&\&C\&\&D \qquad \text{Equation 1:}$$

In Equation 1 above, the MFA policy 108 (P) is a logical combination of sub-policies (e.g., policy A, policy B, policy C, policy D). In Equation 1, "∥" is the logical OR operator, and "&&" is the logical AND operator. Example Equation 1 represents an MFA policy test that defines a threshold for MFA policy compliance. Thus, using Equation 1 above, the MFA policy 108 grants access to a controlled resource if either an example policy A is satisfied (e.g., a user provides an authorized NFC signal signature to an NFC radio) OR if an example policy B is satisfied (e.g., user provides a valid fingerprint signature to satisfy a first sub-policy of the example policy B OR user provides a valid security token AND verified facial pattern to satisfy a second sub-policy of the example policy B). Along with policy A OR policy B being satisfied, the example MFA policy 108 of FIG. 1 also requires that an example policy C is satisfied (e.g., a user required to be within a certain range (e.g., a threshold range) of the host 104 to satisfy a first sub-policy of the example policy C AND user activity not be idle for a threshold period to satisfy a second sub-policy of the example policy C) AND that an example policy D is satisfied (e.g., a Wi-Fi address of the host 104 corresponds to an authorized location).

In some examples, the MFA policy 108 is constructed to include backup sub-policies and/or alternate sub-policies to enforce in, for example, different client environments. For example, if the client environment does not include an NFC radio (e.g. to evaluate policy A), then policy B may still be used to authorize the user. Thus, the MFA policy may be revised based on whether the client environment includes the sensor(s) to enforce the respective sub-policies. Accordingly, the example MFA policy 108 may be a platform agnostic expression and allow users to construct fewer MFA policies to control access to controlled resources in the client environment 100.

In some examples, determining policy compliance (e.g., if an MFA policy is satisfied) may be performed by evaluating the sub-policies as different levels (sometimes referred to herein as policy levels) based on minimum security strength criteria set by the sub-policies. For example, to verify that an NFC signal signature is authorized (e.g., with respect to policy A), the NFC signal signature may be required to comply with three policy levels, where the level 1 sub-policy pertains to whether the NFC signal signature is transmitted to the NFC radio via a trusted channel, a level 2 sub-policy pertains to whether the NFC radio collecting the NFC signal is and/or provides a trusted environment, and a level 3 policy specifies the combination of factors that may be combined to successfully authenticate the user. Although the illustrated example MFA policy 108 of the illustrated example includes three policy levels, an MFA policy or sub-policy may include any suitable number of policy levels such as one, two, or four, etc.

In some examples, the MFA policy 108 includes contextual requirements such as physical or logical location limitations, persistent usage limitations, user presence requirements, etc. In some such examples, access to a controlled resource may be determined by authorized security credentials (e.g., satisfying policy A and/or policy B in the example above), and access to the controlled resource may remain approved while contextual sub-policies (e.g., the policy C and the policy D in the example above) are satisfied (e.g., within one or more thresholds). Thus, for example, contextual sub-policies such as user presence tests, biometric characteristic tests, and/or location tests may be useful in providing an additional layer of security when access to a controlled resource is granted by, for example, checking whether the user has moved from a secure location to another location, whether the user is no longer accessing the controlled resource, etc. In some examples, contextual sub-policies are used to dynamically display and/or withhold information from a user. For example, a web-based authorization screen may prompt a user for first and second credentials when the user requests access to a controlled resource via a public computer. In comparison, the web-based authorization screen may prompt the user for just a first security credential when the controlled resource access request is made via a private (e.g., secure) laptop. For example, the MFA policy 108 may state that a user may access an online service (e.g., a webmail service, a social media service, a personal banking service, etc.) from a trusted computing device (e.g., a personal laptop, a smart phone, a tablet, etc.) by providing a verified username/password combination. The MFA policy 108 may also state that a user may access that same online service by providing an authorized passcode AND a valid security token when requesting access to the online service from an untrusted computing device (e.g., a public library computer, etc.).

In the illustrated example of FIG. 1, the host 104 includes multiple policy handlers, such as a first policy handler 110, a second policy handler 111, and a third policy handler 112. As described above, the example first policy handler 110, the example second policy handler 111, and/or the example third policy handler 112 of FIG. 1 are hardened (e.g., trusted) execution environments that protect MFA policy decisions and enforcement. In some examples, the first policy handler 110, the second policy handler 111, and/or the third policy handler 112 are software components (e.g., an operating system agent, drivers, etc.) and/or hardware/firmware components (e.g., a chipset, a protected portion of memory, etc.) that isolate one or more controlled resources in the host 104. In the illustrated example of FIG. 1, the example first policy handler 110 is a layer 3 policy handler and protects and limits access to a first controlled resource 114 (e.g., a database), the example second policy handler 111 is a layer 2 policy handler and protects and limits access to a first sensor 115 (e.g., a sensor such as an NFC radio) and the example third policy handler 112 is a layer 1 policy handler and protects and limits access to a second sensor 116 (e.g., a sensor such as a fingerprint reader). In some examples, the policy administrator 102 may also be a policy handler (e.g., a layer 4 policy handler) that protects and limits access to, for example, MFA policies (e.g., the example MFA policy 108) available to the policy administrator 102.

In the illustrated example of FIG. 1 the first policy handler 110, the second policy handler 111, and the third policy handler 112, example implementations of which are described in further detail below, facilitate provisioning MFA policies to the policy handlers under the control of the host 104 in the client environment 100, and enforce the provisioned MFA policies when controlled resource access is requested. In the illustrated example of FIG. 1, the example MFA policy 108 is provisioned via a first communication path 129 in the client environment 100 to provide control of access to the example first controlled resource 114 (e.g., a database), which is protected by the example first policy handler 110 in FIG. 1.

In some examples, the first policy handler 110, the second policy handler 111 and/or the third policy handler 112 perform host introspection at periodic intervals, aperiodic intervals, and/or as one-time events, and map (or discover) a topology map 128 of the client environment 100. As used herein, introspection is the process by which a policy handler queries (e.g., examines) itself to identify which, if any, components (e.g., policy handlers, controlled resources, sensors, etc.) it is connected to. In the illustrated example of FIG. 1, the first policy handler 110 maps a second communication path 130 to a policy handler within the host 104 (e.g., the second policy handler 111), and also discovers a third communication path 131 to a policy handler operating external to the host 104, such as a fourth policy handler 118 connected via one or more networks (e.g., cloud-based access via the network 106). In the illustrated example of FIG. 1, the fourth policy handler 118 is a layer 3 policy handler and protects and limits access to a second controlled resource 120 (e.g., a virtual machine). The example first policy handler 110 of FIG. 1 employs the discovered second and third communication paths 130, 131 to provision the MFA policy 108 to the second policy handler 111 and the fourth policy handler 118, respectively. Using a similar process, the second policy handler 111, the third policy handler 112 and/or the fourth policy handler 118 may map fourth and fifth communication paths 132, 133 between the second and third policy handlers 111, 112 and the third and fourth policy handlers 112, 118, respectively.

In some examples, the topology map 128 is prepared by the different policy handlers signing, for example, an introspection request, with an identifier unique to each policy handler. In some examples, the policy handlers may push their respective communication paths to a central policy handler (e.g., the example first policy handler 110). In some such examples, the first policy handler 110 uses the communication paths to build the topology map 128 of the client environment 100. In some examples, the policy handlers may each store a copy of the topology map 128. In some examples, the topology map 128 includes information regarding the policy handler (e.g., functionality type and security strength), and controlled resources, if any, that the policy handler is protecting.

The example policy handlers 110, 111, 112, 118 of the illustrated FIG. 1 apply differing security properties to sensor inputs (e.g., security credentials) when performing multi-factor authorization. In some such examples, the policy handlers 110, 111, 112, 118 may apply (e.g., enforce) different MFA policies and/or sub-policies of an MFA policy based on, for example, the functionality type and security strength of the respective policy handler(s).

For example, the example third policy handler 112 of FIG. 1 (e.g., a layer 1 policy handler) may be a hardware and/or firmware environment that is suited to apply level 1 sub-policies on sensor input. For example, the third policy handler 112 of FIG. 1 may determine whether the security credentials provided by a user (e.g., a fingerprint scan) were obtained via a secure channel (e.g., at a trusted sensor such as a fingerprint reader). In some such examples, the third policy handler 112 may provide its entailment evidence (e.g., a manufacturer certificate, etc.) as proof that that the second sensor 116 is a trusted fingerprint reader.

The example second policy handler 111 of the illustrated FIG. 1 (e.g., a layer 2 policy handler) may be and/or provide a hardware and/or firmware environment that operates, for example, independently of the host 104 operating system and may not be accessible via the host 104 operating system. For example, the second policy handler 111 may implement a "manageability engine" or a "security enclave" which includes processing controlled resources separate from the primary processing controlled resources of the host 104. In some such examples, the second policy handler 111 may be suited to apply level 2 sub-policies that pertain to, for example, whether the fingerprint reader 116 satisfies the minimum security strength criteria. In some such examples, the second policy handler 111 may provide its entailment evidence (e.g., signed code, etc.) as proof that the second sensor 116 satisfies the minimum security strength criteria stated by the level 2 sub-policy.

In some examples, the example first policy handler 110 of FIG. 1 (e.g., a layer 3 policy handler) is implemented by a software agent that is suited to process level 3 sub-policies. For example, the first policy handler 110 may process sub-policies that apply in the operating system environment of the host 104. In some examples, the example fourth policy handler 118 of FIG. 1 (e.g., a layer 3 policy handler) is implemented by a software agent that processes level 3 policies. For example, the fourth policy handler 118 may process sub-policies that apply to cloud services. In the illustrated example of FIG. 1, the first policy handler 110 and/or the fourth policy handler 118 may apply sub-policy levels that determine whether, for example, a fingerprint scan obtained from the second sensor 116 satisfies the threshold compliance for policy compliance. For example, the first policy handler 110 may evaluate whether sensor input satisfies policy A and/or policy B and policy C and policy D of the MFA policy 108.

In the illustrated example of FIG. 1, the example policy administrator 102 of FIG. 1 includes a client handler 122, a policy constructor 124, and the repository 126. The example repository 126 of FIG. 1 may be implemented by any storage device and/or storage disc for storing data such as, for example, flash memory, magnetic media, optical media, etc. Furthermore, the data stored in the example repository 126 may be in any data format such as, for example, binary data, comma delimited data, tab delimited data, structured query language (SQL) structures, etc. While in the illustrated example of FIG. 1 the repository 126 is illustrated as a single database, the repository 126 may be implemented by any number and/or type(s) of databases.

In the illustrated example of FIG. 1, the policy administrator 102 includes the example client handler 122 to interface with policy handlers in the client environment 100. For example, the client handler 122 may query the network 106 at periodic intervals, scheduled intervals, aperiodic intervals, and/or one-time events, to identify hosts including a trusted policy handler to use to propagate policies through the client environment 100. For example, the client handler 122 of FIG. 1 may discover the host 104 including the first policy handler 110 therein. The example client handler 122 may obtain, for example, status updates from the policy handlers 110, 111, 112, 118 of the client environment 100 regarding provisioning and/or enforcing MFA policies. In some examples, the client handler 122 obtains the topology map 128 from the first policy handler 110. In some examples, the policy administrator 102 employs the topology map 128 to, for example, configure the MFA policy 108 based on the policy handlers, sensors and/or controlled resources included in the client environment 100.

In some examples, the client handler 122 presents status updates to a user via, for example, an output device such as a monitor. For example, the client handler 122 may output an indication whether provisioning failed, provisioning was successful, whether controlled resource access was requested and/or whether the MFA policy 108 was successfully enforced, etc.

In the illustrated example of FIG. 1, the policy administrator 102 invokes the policy constructor 124 to author (e.g., configure, create, write, etc.) the example MFA policy 108 within the client environment 100. In some examples, the policy constructor 124 authors the MFA policy 108 based on the topology map 128. In some examples, the policy constructor 124 obtains sub-policies or MFA policies from the example repository 126 to construct the MFA policy 108. For example, the policy constructor 124 of the illustrated example retrieves a first MFA policy to control access to the first controlled resource 114, and a second MFA policy to control access to the second controlled resource 120.

In operation, the example first policy handler 110 of FIG. 1 obtains the MFA policy 108 from the client handler 122 and determines whether the MFA policy 108 includes a sub-policy enforceable by the first policy handler 110. For example, the first policy handler 110 of the illustrated example parses the MFA policy 108 and identifies one or more level 3 policies capable of enforcement by the first policy handler 110. The example first policy handler 110 of this example signs the identified level 3 policies and signs the MFA policy 108. For example, the first policy handler 110 may modify the MFA policy 108 to include a private key unique to the first policy handler 110. In some such examples, the private key is used to determine whether a policy handler has previously parsed the MFA policy 108. For example, the topology map 128 may include a corresponding private key for each policy handler included in the map 128. In some examples, the first policy handler 110 determines whether the MFA policy 108 includes an unsigned sub-policy based on a signature status of the MFA policy 108 and forwards the MFA policy 108 to a policy handler that has not signed the MFA policy 108 (e.g., the example second policy handler 111, the example third policy handler 112, the example fourth policy handler 118, etc.). Using the above process (e.g., by iterating through the sub-policies with one or more policy handlers), the MFA policy 108 is forwarded between the policy handlers and the MFA policy 108 is provisioned within the client environment 100. In some examples, if a policy handler determines that the signature status of the MFA policy 108 indicates an unsigned sub-policy and that all policy handlers included in the topology map 128 have signed the MFA policy 108, the policy handler may send a message to the policy administrator 102 reporting that MFA policy provisioning failed in the client environment 100.

During MFA policy enforcement, the example policy handlers 110, 111, 112, 118 of the illustrated example apply the MFA policy to sensor input (e.g., security credentials) associated with a user seeking to access a controlled resource. For example, the policy handlers 110, 111, 112, 118 of FIG. 1 may enforce MFA policy 108 when access to the first resource 114 (e.g., a database) is requested. In the illustrated example, sensor input 134 (e.g., a fingerprint scan) obtained from the example first sensor 116 may be evaluated by the policy handlers 110, 111, 112, and/or 118. For example, the third policy handler 112 may process a level 1 sub-policy of the example MFA policy 108 and determine whether the second sensor 116 is a trusted sensor. The example second policy handler 111 may process a level 2 sub-policy of the example MFA policy 108 and determine whether the second sensor 116 satisfies the minimum security strength criteria defined by the sub-policy. The example first policy handler 110 may process a level 3 sub-policy of the example MFA policy 108 and determine whether the sensor input 134 satisfies the MFA policy 108 threshold for compliance. In some examples, the processing policy handler may provide its entailment evidence to verify that a trusted communication path mechanism is used to evaluate the sensor input 134. In some examples, the policy handlers operate in parallel. In this example, the policy handlers operate in sequence.

Figure 2:
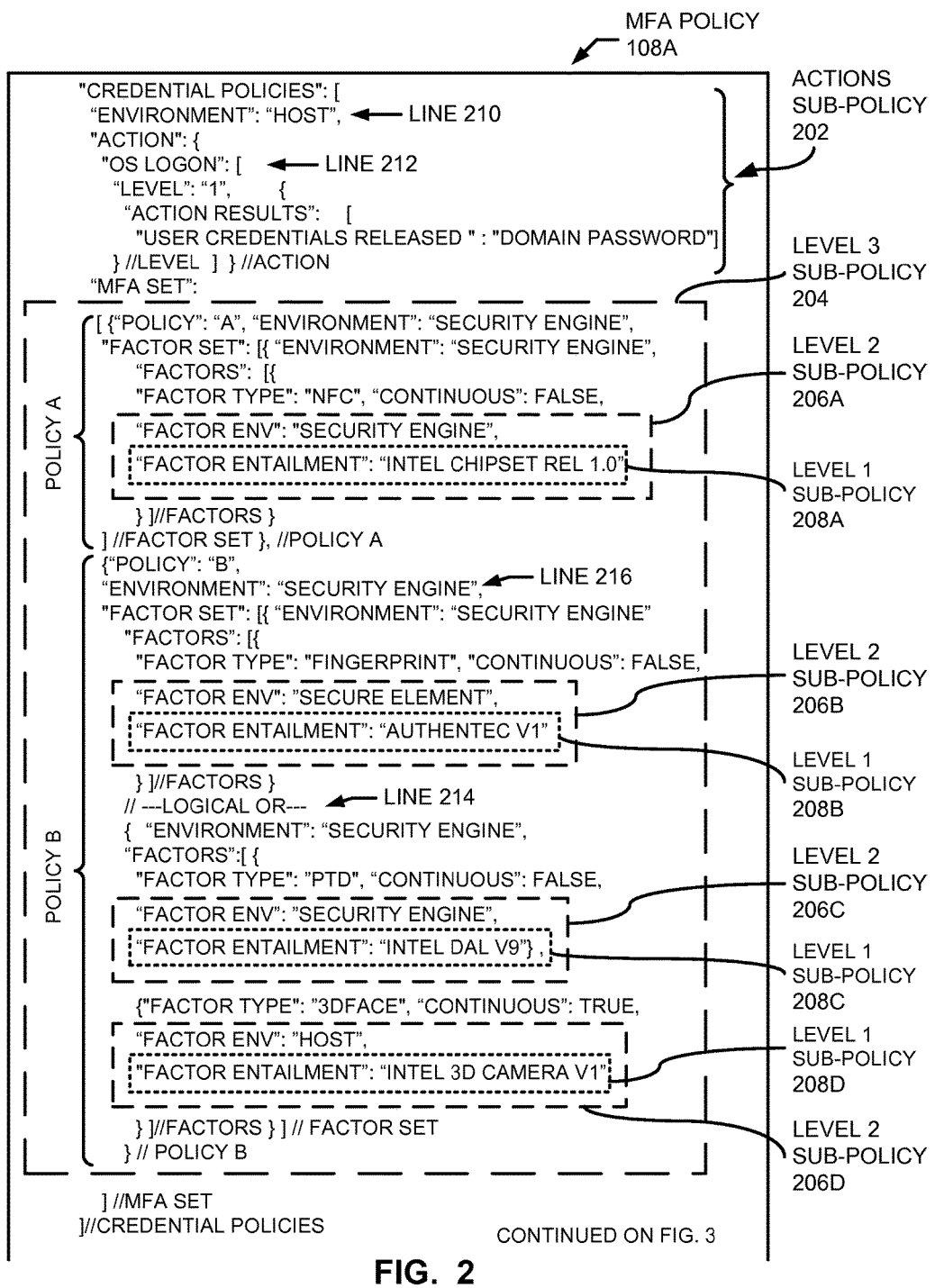
FIGS. 2 and 3 illustrate an example multi-factor authentication policy including pseudo-code that may be executed to control access to a controlled resource in the example client environment of FIG. 1.
Figure 3:
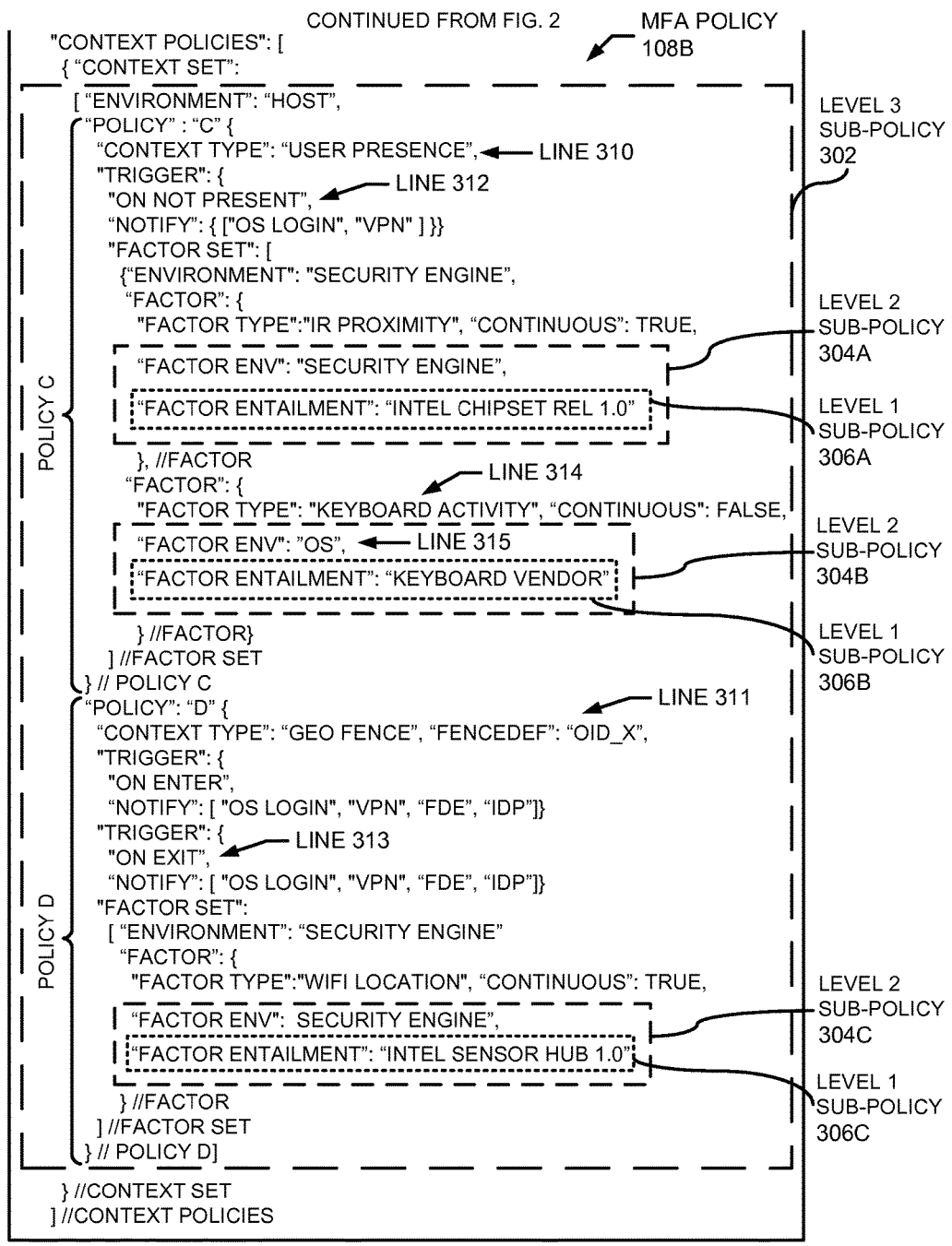

FIGS. 2 and 3 illustrate an example implementation of the example MFA policy 108 including pseudo code that may be executed to control access to a controlled resource in the example client environment 100 of FIG. 1. In the illustrated examples, the MFA policy 108 is a JSON (JavaScript Object Notation) document. However, other policy expression language syntaxes may be used such as XACML (eXtensible Access Control Markup Language), SAML (Security Assertion Markup Language), XML (eXtensible Markup Language), etc. In the illustrated examples of FIGS. 2 and 3, the example MFA policy 108 includes a credential policies section 108A (FIG. 2) to authenticate a user and a context policies section 108B (FIG. 3) to determine whether context requirements such as biometric characteristic tests, and/or user presence/continuous authentication limitations are satisfied.

In the illustrated example of FIG. 2, the credential policies section 108A includes an example actions sub-policy block 202, a level 3 sub-policy block 204, a first level 2 sub-policy block 206A, a second level 2 sub-policy block 206B, a third level 2 sub-policy block 206C, a fourth level 2 sub-policy block 206D, a first level 1 sub-policy block 208A, a second level 1 sub-policy block 208B, a third level 1 sub-policy block 208C, and a fourth level 1 sub-policy block 208D. In the illustrated example of FIG. 2, the actions sub-policy block 202 specifies the action(s) that are taken in response to a successfully applied MFA policy and/or sub-policy and the component (e.g., the host) to which the actions apply. For example, line 210 of FIG. 2 identifies that the host is to perform an "OS Logon" process (line 212) if successful authentication is applied (e.g., the controlled resource is a OS logon process).

In the illustrated example of FIG. 2, the example level 3 sub-policy block 204 specifies the combination of sub-policies (e.g., example policy A OR example policy B) that may be combined using, for example, logical AND and/or OR combinations. For example, line 214 of policy B states that successfully applying policy B includes (1) obtaining a valid fingerprint signature OR (2) obtaining a valid security token AND a verified facial pattern.

In the illustrated example of FIG. 2, the example first level 2 sub-policy block 206A, the second level 2 sub-policy block 206B, the third level 2 sub-policy block 206C, and the fourth level 2 sub-policy block 206D are specific to a respective factor (e.g., a policy handler) and specify the factor environment (e.g., minimum security strength criteria) for the factor type (e.g., functionality requirement). For example, during provisioning of the example policy A, a first policy handler suited to process input from an NFC sensor and that is suited to apply a minimum security strength level policy corresponding to a "security engine" (e.g., level 2 sub-policy 206A) may claim (e.g., sign) the example policy A. If the first policy handler is not suited to process input from the NFC sensor (e.g., the first policy handler does not have access to an NFC sensor or NFC sensor input and/or the first policy handler security strength is not as security as a "security engine" layer policy handler), the example first policy handler may check policy B for a sub-policy capable of enforcement by the first policy handler. Once the first policy handler completes parsing the MFA policy, the first policy handler forwards the MFA policy to a second policy handler. Using the above process (e.g., by iterating through the sub-policies with one or more policy handlers), the MFA policy 108 is forwarded between the policy handlers and the MFA policy 108 is provisioned within the client environment 100.

During enforcement of policy A, the first policy handler may verify that the NFC sensor (e.g., an NFC radio) is a trusted sensor by checking if the entailment of the NFC sensor corresponds to an authorized NFC sensor (e.g., an "Intel chipset Rel 1.0") defined by the level 1 sub-policy 208A statement. If the first policy handler is capable of enforcing the level 1 sub-policy 208A statement, then the first policy handler proceeds to process the NFC sensor input. In some examples, if the first policy handler is unable (e.g., incapable) of enforcing the level 1 sub-policy 208A statement and/or if the client environment 100 includes another policy handler that is more suited to enforce the level 1 sub-policy 208A, the first policy handler may re-direct the sensor input to the next policy handler and/or more suited policy handler. For example, a "security engine" layer policy handler may be suited to evaluate whether policy B is satisfied (line 216), while a "host" layer policy handler may be more suited to evaluate camera input (e.g., level 2 sub-policy 206D). In some such examples, the "security engine" layer policy handler may re-direct the camera input to the "host" layer policy handler to process the camera input.

In the illustrated example, the MFA policy of FIG. 2 is continued on to FIG. 3. The example context policies section 108B of the example of FIG. 3 includes an example level 3 sub-policy block 302 including example policy C to monitor user presence (line 310) and example policy D to monitor location (line 311 "GEO FENCE"). For example, when applying policy C, if the user presence is not detected (line 312 ON NOT PRESENT"), the user's credentials are revoked and access to the host is denied. In the example of policy D, if the user is detected as having exited a geographical perimeter (line 313 ON EXIT"), the user's credentials are revoked and access to the "OS logon" resource is denied.

In the illustrated example of FIG. 3, the example first level 2 sub-policy block 304A, the second level 2 sub-policy block 304B, and the third level 2 sub-policy block 304C pertain to respective factor(s) and specify an acceptable factor environment for the corresponding factor type. For example, when a policy handler applies the level 2 sub-policy block 304B, a determination is made whether the keyboard input (line 314 "KEYBOARD ACTIVITY") was obtained at an operating system layer policy handler (line 315 "'FACTOR ENV': 'OS'"). In the illustrated example of FIG. 3, the example first level 1 sub-policy block 306A, the second level 1 sub-policy block 306B, and the third level 1 sub-policy block 306C pertain to how a sensor is connected to the policy handler (e.g., environment). Using entailment, a policy handler identifies the trusted communication path used to obtain the input. The policy handler may then determine whether the entailment evidence satisfies the respective level 1 sub-policy.

Figure 4:
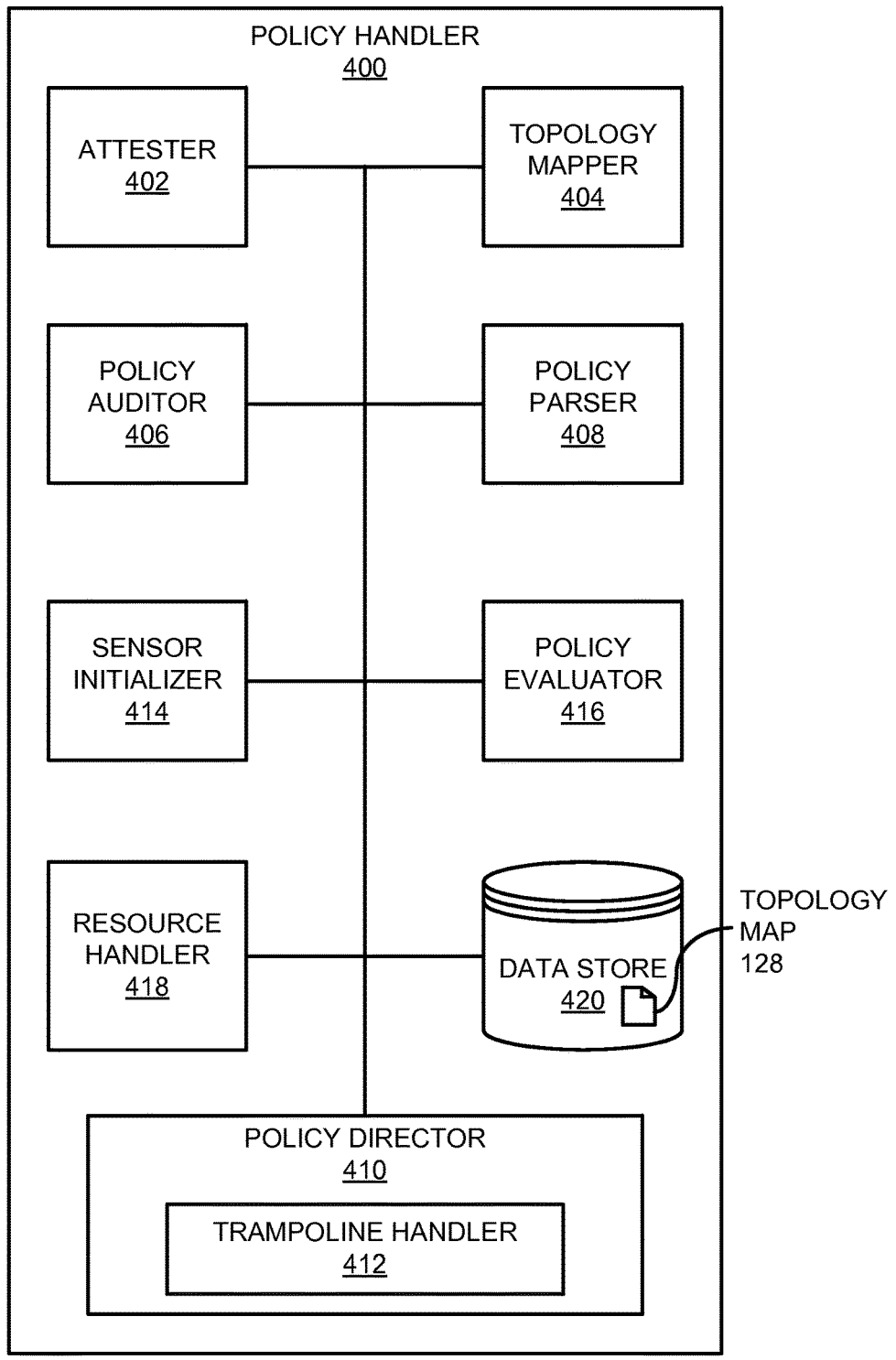
FIG. 4 is a schematic illustration of an example implementation of the example policy handler of FIG. 1.

FIG. 4 is a schematic illustration of an example implementation of an example policy handler 400 to facilitate management of multi-factor authentication (MFA) policies in the example client environment 100 of FIG. 1. In the illustrated example of FIG. 4, the policy handler 400 is provided with an attester 402, a topology mapper 404, a policy auditor 406, a policy parser 408, a policy director 410, a sensor initializer 414, a policy evaluator 416, a resource handler 418, and a data store 420. The example policy handler of FIG. 4 may implement any of the example first policy handler 110, the example second policy handler 111, the example third policy handler 112 and/or the example fourth policy handler 118 of FIG. 1.

In the illustrated example of FIG. 4, the policy handler 400 invokes the attester 402 to attest to the functionality and security properties of the policy handler 400. For example, attester 402 may initiate a series of challenge-request exchanges when accessing MFA policies, sensor inputs, messages, etc. from, for example, the policy administrator 102 and/or another trusted policy handler, to verify the authenticity of the sub-policies, sensor inputs, messages, etc. In some examples, the attester 402 may sign an entailment with a private key unique to the policy handler 400 to, for example, assure to other nodes in the client environment that the policy handler 400 is a trusted environment.

In the illustrated example of FIG. 4, the policy handler 400 invokes the topology mapper 404 to map the topology of the client environment to facilitate provisioning and/or enforcing the MFA policy 108 in the client environment 100. For example, the topology mapper 404 performs introspection of the client environment 100 to discover other trusted environments (e.g., the first policy handler 110, the second policy handler 111, the third policy handler 112, and/or the fourth policy handler 118) in the client environment 100. As described above, introspection enables the example topology mapper 404 to obtain certain information from other nodes, such as whether the node is a policy handler, sensor or a controlled resource, the type of controlled resource, policy handler security strength, policy levels enforceable by a policy handler, one or more sub-policies signed by a policy handler, one or more MFA policies and/or sub-policies applied to a controlled resource, etc.). In the illustrated example of FIG. 4, the topology map 128 is stored in the data store 420. In some examples, the topology map 128 may be stored by a primary policy handler in the client environment (e.g., the example first policy handler 110). In some examples, a policy handler stores a portion of the topology map 128 that corresponds to the respective policy handler. For example, the example third policy handler 112 of FIG. 1 may store information regarding its connections with only the example second policy handler 111 and the fourth policy handler 118 in a topology map it stores in its data store 420. In some examples, during introspection, the example topology mapper 404 also includes characteristics of the policy handlers such as functionality type of the policy handlers and/or the security strength of the policy handlers. For example, the topology map 128 may indicate that the example third policy handler 112 is suited to apply level 1 sub-policies on sensor input with a layer 1 security strength.

As described in detail above, in some examples, the example policy administrator 102 of FIG. 1 employs the topology map 128 to configure the MFA policy 108 based on the client environment topology. For example, the policy administrator 102 may obtain the topology map 128 from the primary policy handler of the client environment 100. For example, the client handler 122 of FIG. 1 may obtain updates from the first policy handler 110 of the client environment at periodic intervals (e.g., every twenty-four hours), and/or at aperiodic intervals (e.g., in response to a request to provision an MFA policy), and/or as a one-time event. In some examples, the policy handlers 110, 111, 112, 118 of FIG. 1 use the topology map 128 to provision the MFA policy 108 through the client environment 100 and/or to enforce the MFA policy 108 in the client environment 100.

In the illustrated example of FIG. 4, the policy handler 400 invokes the policy auditor 406 to monitor MFA policies and/or sub-policies that may be and/or are applied. In some examples, the policy auditor 406 monitors the state of the client environment 100 with respect to, for example, an MFA policy that is or may be provisioned in the client environment 100. For example, the policy auditor 406 of the first policy handler 110 may query the topology map 128 to determine whether the client environment 100 includes the requisite policy handlers to apply an MFA policy and/or sub-policies. In some examples, the policy auditor 406 may record (or log), for example, when an MFA policy is applied by policy handler(s) in the client environment 100, which MFA policy and/or sub-policies were applied, why the MFA policy was applied (e.g., which controlled resource is protected), and which MFA policy and/or sub-policies are being enforced. In some examples, the policy auditor 406 of FIG. 4 stores the log in the data store 420.

In some examples, the policy auditor 406 of FIG. 4 modifies (e.g., revises, filters) the MFA policy based on the topology map. For example, the policy auditor 406 of the first policy handler 110 may identify that the client environment 100 does not include a camera in communication with a policy handler. In some such examples, the policy auditor 406 of FIG. 4 may modify an MFA policy by filtering sub-policies that do not include, for example, collecting a retina scan or a facial pattern.

In the illustrated example of FIG. 4, the policy handler 400 invokes the policy parser 408 to identify sub-policies the policy handler 400 can enforce. For example, when the MFA policy 108 is obtained from the policy administrator 102 to provision in the client environment 100, the first policy handler 110 may parse the MFA policy 108 and identify sub-policies that the policy handler 110 is capable of applying during MFA policy enforcement. For example, the first policy handler 110 may check if its security strength satisfies the minimum security strength criteria of a sub-policy, and if the functionality type of the first policy handler 110 satisfies the functionality requirement defined in the sub-policy. In some examples, the policy parser 408 signs (e.g., claims, marks, etc.) the identified sub-policies in the MFA policy 108. For example, the policy parser 408 may cause the example attester 402 to sign the sub-policy entailment with a private key unique to the policy handler 110. Thus, each policy handler in the client environment locally decides how to provision the MFA policy in the client environment.

In some examples, the policy parser 408 parses the MFA policy 108 and determines that the signature status of the MFA policy 108 does not include an unsigned sub-policy (e.g., the sub-policies combined to configure the MFA policy 108 are all signed by one or more other policy handlers). In some such examples, the policy parser 408 communicates to the policy administrator 102 (or to the primary policy handler) that the example MFA policy 108 is successfully provisioned in the client environment 100.

In the illustrated example of FIG. 4, the policy handler 400 invokes the example policy director 410 to facilitate provisioning of the MFA policy 108 in the client environment 100. For example, the policy director 410 may forward the MFA policy 108 to the next policy handler to which the policy handler is in communication after the example attester 402 signs the policy entailment. For example, after the first policy handler 110 signs the MFA policy 108, the first policy handler 110 may forward (e.g., provision) the MFA policy 108 to the second policy handler 111 and/or the fourth policy handler 118. In some examples, the policy director 410 uses the topology map 128 to identify which policy handler to forward the MFA policy 108. In some examples, the policy director 410 forwards the MFA policy 108 to a policy handler suited to enforce a particular sub-policy based on, for example, the functionality type of the policy handler and/or the security strength of the policy handler. For example, during provisioning, the second policy handler 111 may identify an unsigned level 1 sub-policy with access to a fingerprint reader and/or input from a fingerprint reader (e.g., a fingerprint scan). In some such examples, the second policy handler 111 may employ the topology map to identify a secure communication path to the third policy handler 112 (e.g., a layer 1 policy handler capable of enforcing level 1 sub-policies and in communication with the second sensor 116 (e.g., a fingerprint reader.

In some examples, the policy director 410 forwards the MFA policy 108 to a same layer policy handler. For example, the first policy handler 110 (e.g., a layer 3 policy handler) may identify a sub-policy with minimum security strength criteria satisfied by layer 3 policy handlers (e.g., a level 3 sub-policy), but that the first policy handler 110 does not satisfy the functionality requirement of the sub-policy. In some examples, the first policy handler 110 may employ the topology map 128 to identify a policy handler that satisfies the minimum security strength criteria and functionality requirement of the sub-policy. For example, the first policy handler 110 may identify from the topology map 128 that the fourth policy handler 118 (e.g., a layer 3 policy handler) satisfies the minimum security strength criteria (e.g., a level 3 sub-policy) and functionality requirement of the sub-policy (e.g., cloud-based service). The example first policy handler 110 may then forward the MFA policy 108 to the fourth policy handler 118 to claim (e.g., sign) and to enforce.

In some examples, the policy director 410 may determine that the sub-policy is better enforced by a policy handler at a different security strength layer. For example, the second policy handler 111 (e.g., a layer 2 policy handler) may determine that the third policy handler 112 (e.g., a layer 1 policy handler) has better security properties and, therefore, is preferred for enforcement of the sub-policy. For example, there may be a trusted communication path between second sensor 116 and the third policy handler 112. In some such examples, the policy director 410 of FIG. 4 may direct the sub-policy to the third policy handler 112 to claim and to enforce. In some examples, there may not be a trusted communication path between the two policy handlers at different security layers (e.g., from the layer 2 policy handler 111 to the layer 1 policy handler 112). In the illustrated example of FIG. 4, the policy director 410 invokes a trampoline handler 412 to migrate MFA policy evaluation to the "lower" layer policy handler. For example, the trampoline handler 412 of the second policy handler 111 may re-direct (sometimes referred to herein as "trampoline") the sensor input to the "lower" layer policy handler (e.g., the third policy handler 112). In some such examples, the trampoline handler 412 facilitates aligning the security strength of the policy handler with the MFA policy 108 security requirements (e.g., policy level). For example, if the fourth communication path 132 between (a) the second policy handler 111 receiving the sensor input and (b) the third policy handler 112 to apply the lower security strength level policy is not secure (e.g., is an insecure communication path), the example trampoline handler 412 of the second policy handler 111 may configure (e.g., generate) a secure tunnel between the second policy handler 111 and the third policy handler 112. The trampoline handler 412 of the illustrated example uses a key-exchange protocol such as the sign-and-mac (SIGMA) protocol to construct the secure channel. In some such examples, sensor input obtained by the second policy handler 111 may be re-directed to the third policy handler 112 using the secured communication path. In some examples, the trampoline handler 412 operates as a secure router for sensor input. For example, rather than generating a secure channel from a layer 3 policy handler to a layer 1 policy handler, the layer 3 policy handler may employ the topology map 128 and identify a secure communication path from the layer 3 policy handler to a layer 2 policy handler, and a secure communication path from the layer 2 policy handler to the layer 1 policy handler. In some such examples, the layer 3 policy handler may employ the trampoline handler 412 of the layer 2 policy handler to route the sensor input from the layer 3 policy handler to the layer 1 policy handler.

In some examples, the policy director 410 determines that the MFA policy 108 includes a sub-policy that cannot be enforced by the policy handlers in the client environment 100. For example, during provisioning, the policy director 410 may determine that the signature status of the MFA policy 108 includes an unsigned sub-policy and that the MFA policy 108 is signed by the policy handlers 110, 111, 112, 118 included in the topology map 128. In some such examples, the policy director 410 communicates to the policy administrator 102 that the example MFA policy 108 cannot be provisioned in the client environment 100.

In the illustrated example of FIG. 4, the policy handler 400 invokes the example sensor initializer 414 to initiate a sensor when sensor activity is requested and/or detected. For example, when access to the first controlled resource 114 is requested, the sensor initializer 414 may initiate the sensors that may obtain security credentials from the user to authenticate the user. For example, a sensor such as the first sensor 116 (e.g., a fingerprint reader) may be placed in a low power (e.g., sleep) state while not active (e.g., not obtaining fingerprint readings). In some such examples, the example sensor initializer 414 of FIG. 4 initiates (e.g., awaken) the first sensor 116 to obtain and/or prepare to obtain sensor input.

In some examples, the MFA policy 108 specifies execution related metrics of the sensor and/or policy handler such as policy handler power, latency, computing, etc. to increase applying the MFA policy 108. In some examples, the sensor initializer 414 may modify characteristics of the sensor during multi-factor authentication. For example, if a sensor delivers a more accurate reading of user presence at a higher power level compared to, for example, out-of-band power levels, user custom power levels, etc., the sensor initializer 414 may signal the sensor to transition to the higher power level. In some examples, the sensor initializer 414 may signal a sensor to transition to a lower power level. For example, while a Bluetooth Low Energy (BLE) radio may typically operate at a multi-meter communication range, the sensor initializer 414 may cause the BLE radio to transition to a lower power level and, thereby, lessen the communication range of the BLE radio to millimeters during user authentication. In some such examples, if the user is authenticated (e.g., satisfies the MFA policy), the sensor initializer 414 may signal the BLE radio to return to the previous (e.g., higher) power level.

In the illustrated example of FIG. 4, the policy handler 400 invokes the policy evaluator 416 to process the MFA policy 108 during enforcement. For example, the policy evaluator 416 may enforce the sub-policies that were signed by the example policy parser 408. For example, the third policy handler 112 may apply level 1 policies of the MFA policy 108 to the sensor input 134. In some examples, the policy evaluator 416 determines whether the sensor input satisfies the applied sub-policy by comparing the sensor input to authorized values. For example, during authentication and/or user presence sampling, the example policy evaluator 416 may compare sensor input (e.g., an NFC signal) to an authorized NFC signal signature. For example, the policy evaluator 416 may retrieve an authorized NFC signal signature from the example data store 420 and compare the retrieved NFC signal signature to the NFC signal. In some examples, the policy evaluator 416 evaluates the sensor input (e.g., the NFC signal) continuously (or near continuously). In some examples, the policy evaluator 416 samples the NFC signal at periodic intervals, aperiodic intervals, or one-time events.

In some examples, the policy evaluator 416 may determine that the signal input fails compliance with the sub-policy. For example, the second policy handler 111 applying a level 2 sub-policy on the signal input 134 may determine that the signal input 134 was not obtained at a trusted environment. In some such examples, the policy evaluator 416 of the second policy handler 111 may instruct the policy director 410 to identify another policy handler to evaluate the sensor input 134.

In some examples, the policy evaluator 416 determines that the MFA policy 108 is satisfied (e.g., either example policy A OR policy B is satisfied AND policy C is satisfied AND policy D is satisfied). In some such examples, the policy handler 400 of FIG. 4 includes the example resource handler 418 to enforce access to the requested controlled resource. In the illustrated example of FIG. 4, the policy evaluator 416 signals to the resource handler 418 enforcing access to the requested controlled resource whether the MFA policy 108 is satisfied or not satisfied. For example, while the MFA policy 108 may be invoked when the controlled resource 114, which is protected by the resource handler 418 of the first policy handler 110 (e.g., a layer 3 policy handler), the decision to grant or deny access to the controlled resource 114 may be made at different policy handler. For example, in the example credential policies section 108A of FIG. 2, while the controlled resource "OS Logon" is protected by a "host" layer policy handler, the decision of whether policy A is satisfied is evaluated at a "security engine" layer policy handler, compliance of the level 2 sub-policy 206B of policy B is evaluated at a "secure element" layer policy handler, and compliance of the level 2 sub-policy 206D is evaluated at the "host" layer policy handler. In some such examples, after a policy and/or a sub-policy is evaluated, the controlled resource access request decision is forwarded to the policy handler protecting the controlled resource (e.g., the first policy handler 110). In some such examples, the resource handler 418 protecting the requested controlled resource obtains a message including the controlled resource access request decision. In some examples, the policy evaluator 416 of the evaluating policy handler may broadcast the message to the other policy handlers in the client environment 100. In some examples, a change in controlled resource access status may be broadcast to the other policy handlers in the client environment 100. For example, if access to the first controlled resource 114 is revoked, then the first policy handler 110 may broadcast the status change to the second policy handler 111, the third policy handler 112, and the fourth policy handler 118. In some examples, the controlled resource access status message is communicated via a trusted channel (e.g., via the SIGMA protocol) between policy handlers in the client environment 100.

The example data store 420 of FIG. 4 may be implemented by any storage device and/or storage disc for storing data such as, for example, flash memory, magnetic media, optical media, etc. Furthermore, the data stored in the data store 420 may be in any data format such as, for example, binary data, comma delimited data, tab delimited data, structured query language (SQL) structures, etc. While in the illustrated example the data store 420 is illustrated as a single database, the data store 420 may be implemented by any number and/or types of databases.

While example manners of implementing the system and/or policy handlers have been illustrated in FIGS. 1 and 4, one or more of the elements, processes and/or devices illustrated in FIGS. 1 and/or 4 may be combined, divided, re-arranged, omitted, eliminated and/or implemented in any other way. Further, the example policy administrator 102, the example host 104, the example first policy handler 110, the example second policy handler 111, the example third policy handler 112, the example first controlled resource 114, the example first sensor 115, the example second sensor 116, the example fourth policy handler 118, the example second controlled resource 120, the example attester 402, the example topology mapper 404, the example policy auditor 406, the example policy parser 408, the example policy director 410, the example trampoline handler 412, the example sensor initializer 414, the example policy evaluator 416, the example resource handler 418, the example data store 420 and/or, more generally, the example policy handler 400 may be implemented by hardware, software, firmware and/or any combination of hardware, software and/or firmware. Thus, for example, any of the example policy administrator 102, the example host 104, the example first policy handler 110, the example second policy handler 111, the example third policy handler 112, the example first controlled resource 114, the example first sensor 115, the example second sensor 116, the example fourth policy handler 118, the example second controlled resource 120, the example attester 402, the example topology mapper 404, the example policy auditor 406, the example policy parser 408, the example policy director 410, the example trampoline handler 412, the example sensor initializer 414, the example policy evaluator 416, the example resource handler 418, the example data store 420 and/or, more generally, the example policy handler 400 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example policy administrator 102, the example host 104, the example first policy handler 110, the example second policy handler 111, the example third policy handler 112, the example first controlled resource 114, the example first sensor 115, the example second sensor 116, the example fourth policy handler 118, the example second controlled resource 120, the example attester 402, the example topology mapper 404, the example policy auditor 406, the example policy parser 408, the example policy director 410, the example trampoline handler 412, the example sensor initializer 414, the example policy evaluator 416, the example resource handler 418, and/or the example data store 420 is/are hereby expressly defined to include a tangible computer readable storage device or storage disk such as a memory, a digital versatile disk (DVD), a compact disk (CD), a Blu-ray disk, etc. storing the software and/or firmware. Further still, the example policy handlers 110, 111, 112, 118 of FIG. 1 may include one or more elements, processes and/or devices in addition to, or instead of, those illustrated in FIG. 4, and/or may include more than one of any or all of the illustrated elements, processes and devices.

Figure 5:
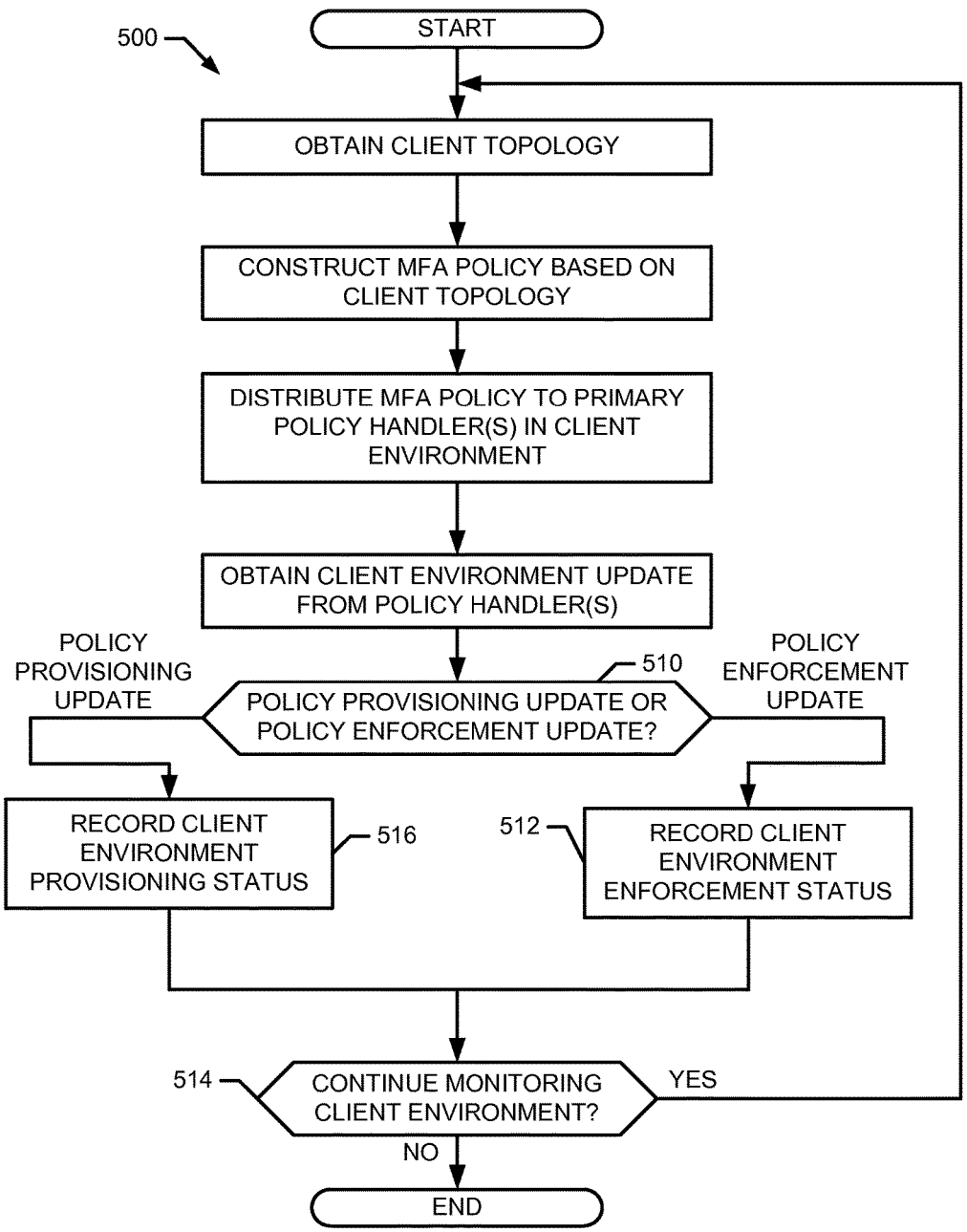
FIG. 5 is a flowchart representative of example machine readable instructions that may be executed to provision a multifactor authentication policy in the distributed computing environment of FIG. 1
Figure 6:
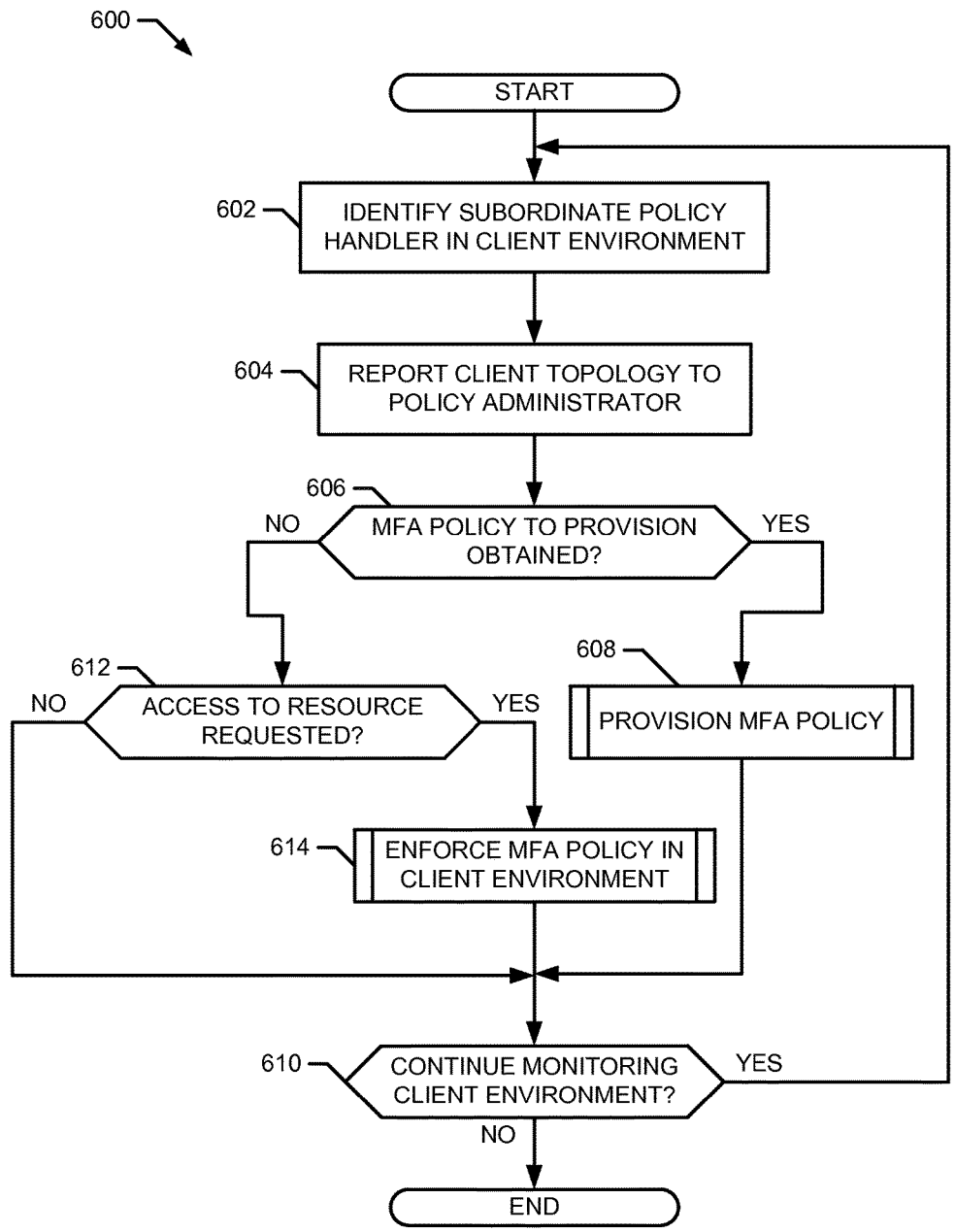
FIG. 6 is a flowchart representative of example machine readable instructions that may be executed to facilitate multifactor authentication policy enforcement.
Figure 7:
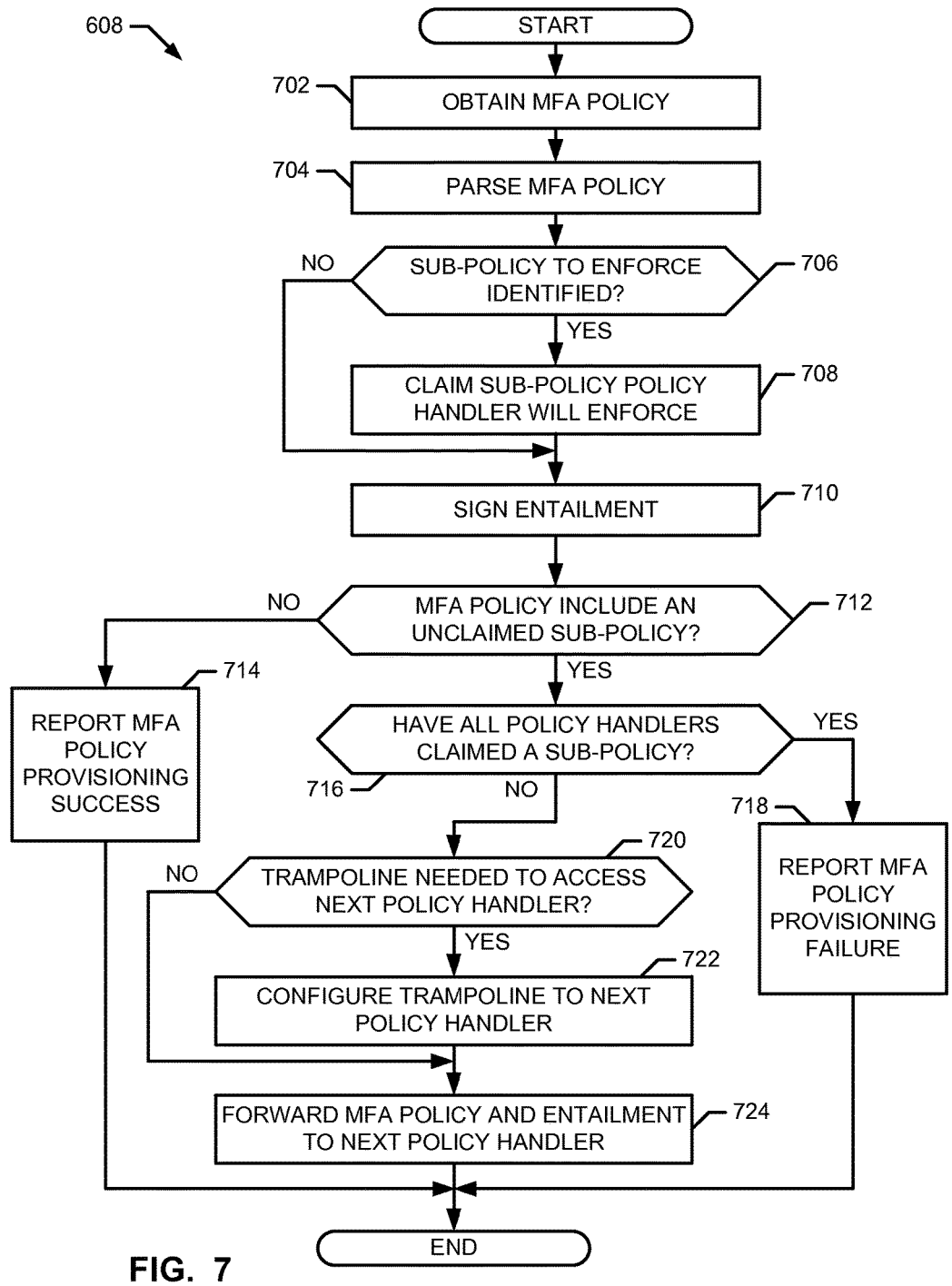
FIG. 7 is a flowchart representative of example machine readable instructions that may be executed to provision a multi-factor authentication policy in the distributed computing environment of FIG. 1.
Figure 8:
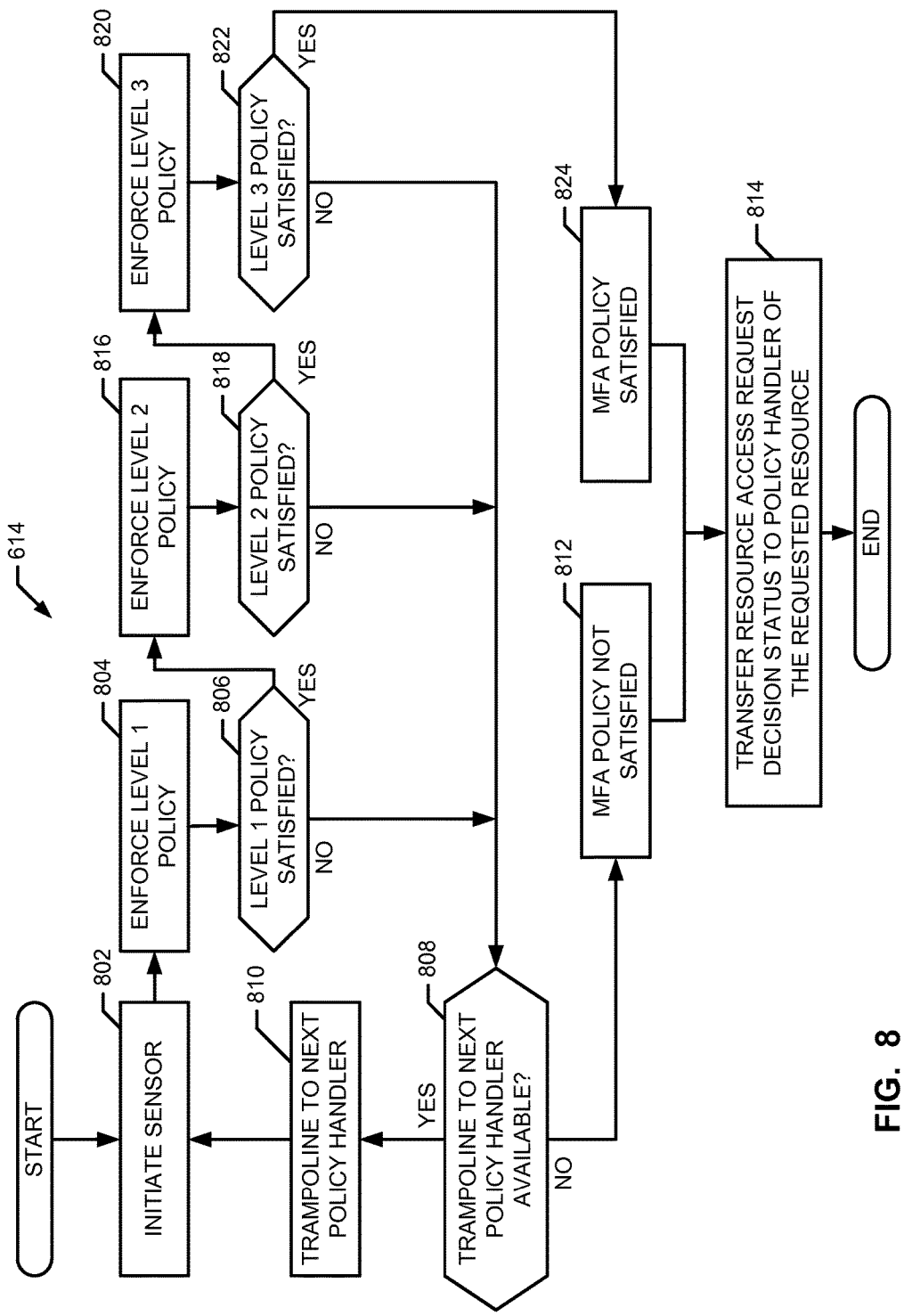
FIG. 8 is a flowchart representative of example machine readable instructions that may be executed to enforce multi-factor authentication policies in the distributed computing environment of FIG. 1.

Flowcharts representative of example machine readable instructions for implementing the policy administrator 102 of FIG. 1 is shown in FIG. 5, and flowcharts representative of example machine readable instructions for implementing the policy handlers 110, 111, 112, 118 and/or the policy handler 400 of FIGS. 1 and/or 4, respectively, are shown in FIGS. 6-8. In these examples, the machine readable instructions comprise a program for execution by a processor such as the processor 912 shown in the example processor platform 900 discussed below in connection with FIG. 900. The programs may be embodied in software stored on a tangible computer readable storage medium such as a CD-ROM, a floppy disk, a hard drive, a digital versatile disk (DVD), a Blu-ray disk, or a memory associated with the processor 912, but the entire programs and/or parts thereof could alternatively be executed by a device other than the processor 912 and/or embodied in firmware or dedicated hardware. Further, although the example programs are described with reference to the flowcharts illustrated in FIGS. 5-8 many other methods of implementing the example policy administrator 102 and/or the policy handlers 110, 111, 112, 118 and/or the policy handler 400 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 5 may be used to facilitate management of multi-factor authentication policy (or policies) in a client environment using policy handlers distributed in the client environment. The example program 500 begins at block 502 when the example policy administrator 102 (FIG. 1) obtains client topology information for the client environment 100 (FIG. 1). For example, the client handler 122 (FIG. 1) may obtain the client topology map 128 (FIGS. 1 and/or 4) from the first policy handler 110 (FIG. 1) distributed in the client environment 100. At block 504, the policy administrator 102 constructs the multi-factor authentication (MFA) policy 108 for enforcing in the client environment 100. For example, the example policy constructor 124 (FIG. 1) may author the MFA policy 108 based on the client topology map 128 provided by, for example the first policy handler 110. At block 506, the example policy administrator 102 distributes the MFA policy 108 to a primary policy handler in the client environment 100. For example, the client handler 122 may provision the MFA policy 108 to the first policy handler 110. At block 508, the policy administrator 102 obtains an update regarding the client environment 100 from the policy handlers distributed in the client environment 100. For example, the client handler 122 may obtain an update from one or more of the first policy handler 110, the second policy handler 111, the third policy handler 112, and/or the fourth policy handler 118 (FIG. 1).

At block 510, the client handler 122 determines whether the update pertains to MFA policy provisioning or to MFA policy enforcement. If, at block 510, the client handler 122 determines that the update is regarding policy enforcement, then, at block 512, the policy administrator 102 records client environment enforcement status. For example, the client handler 122 may record in the example repository 126 (FIG. 1) whether the MFA policy 108 was successfully enforced in the client environment 100, which sub-policies of the MFA policy 108 are signed by the corresponding policy handlers (e.g., the signature status of the of the MFA policy 108), etc. In some examples, the client handler 122 may present the client environment enforcement status to a user via, for example a monitor. Control then proceeds to block 514 to determine whether to continue monitoring the client environment 100.

Otherwise, if, at block 510, the client handler 122 determines that the update pertains to MFA policy provisioning, then, at block 516, the policy administrator 102 records the provisioning status of the MFA policy 108 in the client environment 100. For example, the client handler 122 records the provisioning status (e.g., provisioning failed, provisioning successful, etc.) received from the first policy handler 110 in the repository 126. In some examples, if provisioning the MFA policy 108 fails, the policy administrator 102 constructs a new MFA policy to provision in the client environment 100. In some examples, the client handler 122 presents the client environment provisioning status to a user via, for example a monitor. Control then proceeds to block 514 to determine whether to continue monitoring the client environment 100.

At block 514, the policy administrator 102 determines whether to continue monitoring the client environment 100. For example, the client handler 122 may obtain another update from the client environment 100. If, at block 514, the example policy administrator 102 determines to continue monitoring the client environment 100 (e.g., the client handler 122 obtains another status update, etc.), control returns to block 502 to obtain client topology information for the client environment 100. Otherwise, if at block 514, the policy administrator 102 determines to end monitoring the client environment 100 (e.g., due to a shutdown event, etc.), the example process 500 of FIG. 5 then ends.

The program of FIG. 6 illustrates an example method of provisioning the MFA policy 108 in the client environment 100 (FIG. 1) using one or more policy handlers (e.g., the example first policy handler 110 (FIG. 1), the example second policy handler 111 (FIG. 1), the example third policy handler 112 (FIG. 1), the example fourth policy handler 118 (FIG. 1), and/or, more generally, the example policy handler 400 of FIG. 4) distributed in the client environment 100. The program 600 of FIG. 6 begins at block 602 when the example policy handler 400 identifies subordinate policy handlers in the client environment 100. For example, the example topology mapper 404 (FIG. 4) may perform introspection of the client environment 100 and identify (e.g., map and/or discover) communication paths to trusted environments included in the client environment 100. In some examples, the topology mapper 404 may record the results of the introspection in the example topology map 128 (FIGS. 1 and 4). At block 604, the policy handler 400 reports the client topology 128 to the example policy administrator 102 (FIG. 1). For example, the subordinate policy handlers (e.g., the second policy handler 111, the third policy handler 112, and/or the fourth policy handler 118) may report their respective communication paths to the first policy handler 110, and the first policy handler 110 may report the topology map 128 of the client environment 100 to the policy administrator 102. At block 606, the example policy handler 400 determines whether it obtained the example MFA policy 108 to provision through the client environment 100. For example, the primary policy handler 110 may obtain the MFA policy 108 to provision through the client environment 100 from the policy administrator 102 and/or the subordinate policy handlers may obtain the MFA policy 108 to provision from the primary policy handler. If, at block 606, the policy handler 400 obtains the MFA policy 108, then, at block 608, the policy handler 400 provisions the MFA policy 108 through the client environment 100. In the illustrated example, the operation of block 608 may be implemented using the process of FIG. 7 as described. Control proceeds to block 610 to determine whether to continue monitoring the client environment 100.

Otherwise, if, at block 606, the policy handler 400 does not obtain the MFA policy 108 to provision, then, at block 612, the policy handler 400 determines whether access to a controlled resource (e.g., the example first controlled resource 114 (FIG. 1), and/or the example second controlled resource 120 (FIG. 1)), controlled in the client environment 100 is requested. For example, a user may initiate an operating system logon process. If, at block 612, the policy handler 400 determines that access to a controlled resource was not requested, then, control proceeds to block 610 to determine whether to continue monitoring the client environment 100.

Otherwise, if, at block 612, the policy handler 400 determines access to a controlled resource under the control of the client environment 100 was requested, then, at block 614, the policy handler 400 enforces the MFA policy 108 in the client environment 100. For example, the policy handler 400 may apply the MFA policy 108 to determine whether to grant or deny access to the requested controlled resource. In the illustrated example, the operation of block 614 may be implemented using the process of FIG. 8 as described. Control proceeds to block 610 to determine whether to continue monitoring the client environment 100.

At block 610, the policy handler 400 determines whether to continue monitoring the client environment 100. For example, the policy handler 400 may obtain another request for access to a controlled resource under the control of the client environment 100. If, at block 610, the example policy handler 400 determines to continue monitoring the client environment 100 (e.g., the policy handler 400 obtains a request for access to a controlled resource, etc.), control returns to block 602 to identify subordinate policy handlers in the client environment 100. Otherwise, if, at block 610, the policy handler 400 determines to end monitoring the client environment 100 (e.g., due to a shutdown event, etc.), the example process 600 of FIG. 6 then ends.

The program of FIG. 7 illustrates an example method of provisioning the example MFA policy 108 (FIGS. 1-3) through the example client environment 100 (FIG. 1). Although the example program of FIG. 7 references the policy handler 400, any of the policy handlers 110, 111, 112, 118 may be used to implement the program of FIG. 7. The example program of FIG. 7 may be used to implement block 608 of FIG. 6. The program of FIG. 7 begins at block 702 when the example policy handler 400 obtains the MFA policy 108 to provision. For example, the primary policy handler(s) in the topology map 128 may obtain the MFA policy 108 from the example policy administrator 102 (FIG. 1) and/or the subordinate policy handlers in the topology map 128 may obtain the MFA policy 108 from the primary policy handler. At block 704, the policy handler 400 parses the MFA policy 108. For example, the example policy parser 408 (FIG. 4) may parse the MFA policy 108 to determine whether the MFA policy 108 includes a sub-policy that the policy handler 400 can enforce. If, at block 706, the policy parser 408 determines that the MFA policy 108 includes one or more sub-policies to enforce, then, at block 708, the policy handler 400 claims the sub-policies that the policy handler 400 will enforce. In some examples, the policy handler 400 signs the sub-policy to claim the sub-policy. For example, the policy parser 408 of the policy handler 110 may sign level 3 sub-policies in the MFA policy 108.

If, at block 706, the policy parser 408 determines that the MFA policy 108 does not include a sub-policy that the policy handler 400 is capable of enforcing, or, after the policy parser 408 signs the MFA policy 108 at block 708, then, at block 710, the policy handler 400 signs the policy entailment. For example, the example attester 402 (FIG. 4) may sign the MFA policy 108 with a private key unique to the policy handler 400 to indicate that the policy handler 400 has parsed the MFA policy 108.

At block 712, the example policy handler 400 determines whether the signature status of the MFA policy 108 includes one or more unclaimed sub-policies. If, at block 712, the example policy parser 408 determines that the signature status of the MFA policy 108 does not include an unclaimed sub-policy, then, at block 714, the policy parser 408 reports to the policy administrator 102 that the MFA policy 108 was successfully provisioned. In some examples, the policy parser 408 may report that the MFA policy 108 was successfully provisioned to a primary policy handler. The example process of FIG. 7 then ends.

Otherwise, if, at block 712, the policy parser 408 determines that the signature status of the MFA policy 108 includes one or more unclaimed sub-policies, then, at block 716, the example policy director 410 (FIG. 4) determines whether all the policy handlers included in the client environment 100 have claimed a sub-policy. For example, the policy director 410 may parse the policy entailment (e.g., policy chain of trust) to determine whether signatures for all of the policy handlers in the client environment 100 are included in the entailment. For example, the policy director 410 may compare the list of private keys included in the policy entailment to the private keys included in the example topology map 128 (FIGS. 1 and 4). If, at block 716, the policy director 410 determines that the policy entailment does include all policy handlers in the client environment 100, then, at block 718, the policy director 410 reports to the policy administrator 102 that the policy handlers failed to provision the MFA policy 108 in the client environment 100. In some examples, the policy director 410 may report that the MFA policy 108 was unsuccessfully provisioned to a primary policy handler. The example process of FIG. 7 then ends.

Otherwise, if, at block 716, the policy director 410 determines that the policy entailment does not include all policy handlers (e.g., the client environment 100 includes a policy handler yet to process the MFA policy 108), then, at block 720, the policy director 410 determines whether a trampoline is needed to access the next policy handler. For example, the policy director 410 may determine whether the next policy handler is at a "lower" layer than the currently processing policy handler (e.g., the next policy handler applies a higher security strength to sensor input). If, at block 720, the policy director 410 determines that a trampoline is needed to access the next policy handler, then, at block 722, the policy handler configures a trampoline to the next policy handler. For example, the example trampoline handler 412 (FIG. 4) may create a trusted tunnel using, for example, a key-exchange protocol such as the SIGMA protocol between the two policy handlers.

If, at block 720, the policy director 410 determines that a trampoline is not needed to access the next policy handler (e.g., the next policy handler is on the same layer as the processing policy handler), or, after the trampoline handler 412 configures the trampoline at block 722, then, at block 724, the policy director 410 forwards the MFA policy 108 and the policy entailment to the next policy handler to process. The example process of FIG. 7 then ends.

The program of FIG. 8 illustrates an example method of enforcing the example MFA policy 108 (FIGS. 1-3) in the example client environment 100 (FIG. 1). Although the illustrated example of FIG. 8 includes enforcing three policy levels (e.g., level 1 sub-policies, level 2 sub-policies, level 3 sub-policies), any suitable number of policy levels such as one, two, or four, etc. may alternatively be used.

The example program of FIG. 8 may be used to implement block 614 of FIG. 6. The program of FIG. 8 begins at block 802 when the example policy handler 400 (FIG. 4) initiates a sensor such as the example fingerprint reader 116 (FIG. 1). For example, sensor activity may be requested and/or detected (e.g., obtaining the example sensor input 134 from the second sensor 116) in response to a controlled resource access request of the example database 114 (FIG. 1). In some examples, the sensor initializer 414 (FIG. 4) modifies characteristics of the sensor in response to, for example, context sub-policies included in the MFA policy 108. For example, the sensor initializer 414 may adjust the power, latency, processing power, etc. of the fingerprint reader 116 to, for example, optimize applying the MFA policy 108. At block 804, the policy handler 400 enforces a level 1 sub-policy on the sensor input. In the illustrated example of FIG. 1, the third policy handler 112 may attempt to enforce level 1 sub-policies on the sensor input 134. If, at block 806, the example policy evaluator 416 determines that the level 1 sub-policy is not satisfied (e.g., the fingerprint reader is not a trusted fingerprint reader), then, at block 808, the example policy director 410 determines whether a trampoline is available to another policy handler that may have access to a trusted fingerprint reader and/or access to input from a trusted fingerprint reader. For example, the policy director 410 may determine whether a trampoline to the second policy handler 111 (FIG. 1) is available. If, at block 808, the policy director 410 determines that a trampoline is available (e.g. a trusted channel from the third policy handler 112 to the second policy handler 111), then, at block 810, the example trampoline handler 412 facilitates re-directing the sensor input 134 to the policy handler via the secure channel. For example, the policy director 410 may forward the sensor input 134 to the second policy handler 111 via the trampoline created by the trampoline handler 412. Control returns to block 802 and the example policy handler initiates the sensor.

Otherwise, if, at block 808, the example policy director 410 determines that a trampoline to the next policy handler is not available, then, at block 812, the MFA policy 108 is not satisfied. At block 814, the controlled resource access request decision (e.g., denied) is transferred to the policy handler protecting the requested controlled resource. For example, if the third policy handler 112 is unable to enforce the level 1 sub-policy on the sensor input 134, the third policy handler 112 may transfer the decision to the example resource handler 418 (FIG. 4) of the first policy handler 110 to enforce the decision (e.g., deny access to the first controlled resource 114). The example process 800 of FIG. 8 then ends.

Returning to block 806, if, at block 806, the policy evaluator 416 determines that the sensor input 134 satisfies the level 1 sub-policy (e.g., the second sensor 116 is a trusted fingerprint reader), then, at block 816, the policy handler enforces a level 2 sub-policy on the sensor input. If, at block 818, the policy evaluator 416 determines that the level 2 sub-policy is not satisfied (e.g., the fingerprint reader does not satisfy the minimum security strength criteria defined in the sub-policy), then, control returns to block 808 to determine if a trampoline is available to another policy handler to enforce the level 2 sub-policy. Otherwise, if, at block 818, the policy evaluator 416 determines that the sensor input satisfies the level 2 sub-policy, then, at block 820, the policy handler enforces a level 3 sub-policy on the sensor input. If, at block 822, the policy evaluator 416 determines that the level 3 sub-policy is not satisfied (e.g., one or more of policy A, policy B, policy C, policy D did not result in a true statement), then, control returns to block 808 to determine if a trampoline is available to another policy handler to enforce the level 3 sub-policy.

If, at block 822, the policy evaluator 416 determines that the sensor input satisfies the level 3 sub-policy, then, at block 824, the MFA policy 108 is satisfied. At block 814, the controlled resource access request decision (e.g., approved) is transferred to the policy handler protecting the requested controlled resource. For example, the resource handler 418 enforces the decision (e.g., allow access to the first controlled resource 114). The example process 800 of FIG. 8 then ends.

Although the example method disclosed in FIG. 8 operates in sequence, the policy handlers may operate in parallel. Additionally or alternatively, an MFA policy may not include one or more policy levels. For example, the MFA policy may not include level 1 policies, level 2 policies and/or level 3 policies. For example, when enforcing an MFA policy without level 1 policies, control may proceed from block 802 to block 816. A similar process may be employed if the MFA policy does not include level 2 policies and/or level 3 policies.

Figure 9:
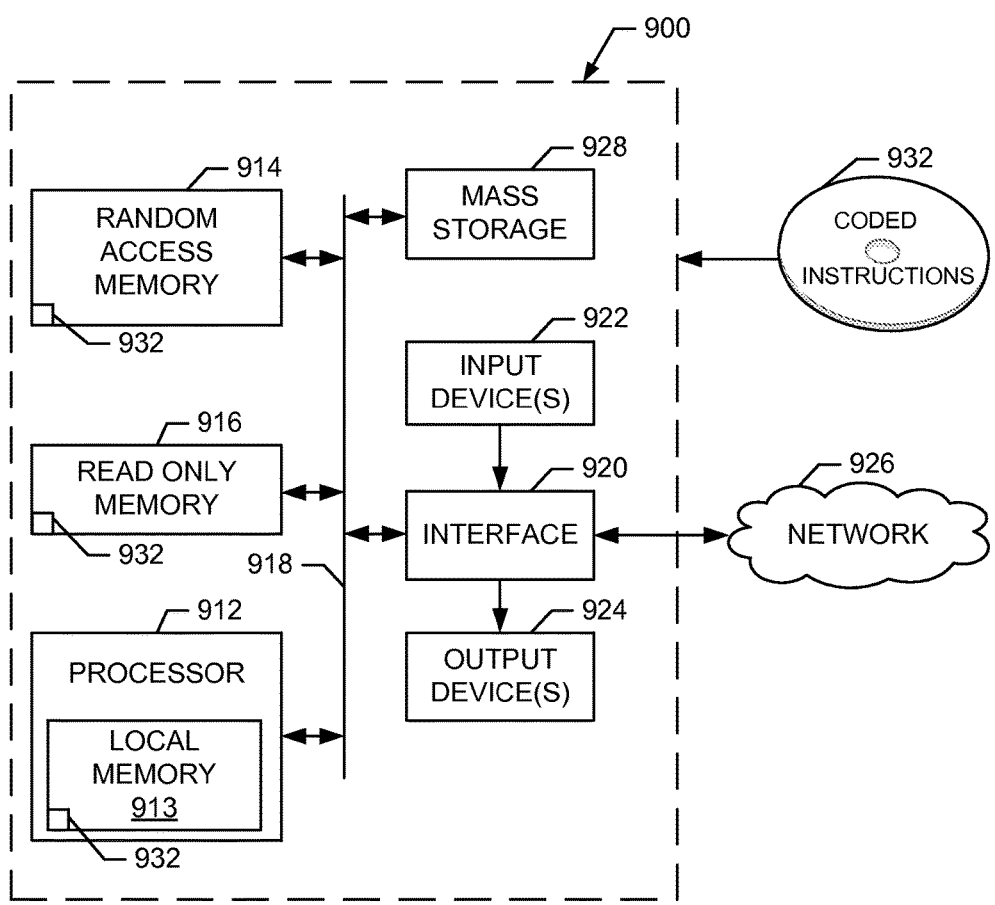
FIG. 9 is a schematic illustration of an example processor platform that may execute the example machine readable instructions of FIGS. 5-8 to implement the example policy administrator of FIG. 1 and/or the example policy handler of FIGS. 1 and/or 4, respectively.

FIG. 9 is a block diagram of an example processor platform 900 capable of executing the instructions of FIGS. 5-8 to implement the policy administrator 102 of FIG. 1 and/or the policy handlers 110, 111, 112, 118 of FIG. 1 and/or the policy handler 400 of FIG. 4. The processor platform 900 can be, for example, a server, a personal computer, a mobile device (e.g., a cell phone, a smart phone, a tablet such as an iPad™), a personal digital assistant (PDA), or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5-8 may be stored in the mass storage device 928, in the volatile memory 914, in the non-volatile memory 916, and/or on a removable tangible computer readable storage medium such as a CD or DVD.

The following examples identify additional example methods, apparatus, systems and/or articles of manufacture disclosed herein. An example policy handler to manage a global policy in a distributed environment includes a parser to identify a first sub-policy of the global policy that is capable of enforcement by a first policy handler, an attester to sign the first sub-policy, and a director to determine whether to forward the global policy to a second policy handler based on a signature status of the global policy, and forward the global policy to the second policy handler when the signature status of the global policy is indicative of an unsigned second sub-policy. In other disclosed examples, the first policy handler includes a mapper to generate a map to identify the first policy handler and the second policy handler, the map to identify (a) a communication path between the first policy handler and the second policy handler, and (b) the signature of the second policy handler, and where the director is to process the map and forward the global policy to the second policy handler when the signature status of the global policy does not include the second policy handler signature identified in the map. Other disclosed policy handlers include examples where the director is to determine whether the communication path identified in the map is a secure path. In some other examples, the first policy handler includes a trampoline handler to, in response to a determination that the communication path is an insecure path, generate a second secure path between the first policy handler to the second policy handler. In still other examples, the first policy handler includes an auditor to record application of the global policy based on other policy handlers included in the map. Other disclosed policy handlers include examples where the auditor is to process the global policy by identifying a factor included in a third sub-policy of the global policy, determining whether the map identifies a communication path to a sensor that corresponds to the factor, and creating a revised global policy excluding the third sub-policy when the map does not identify the communication path to the sensor, and the director is to forward the revised global policy to the second policy handler via a secured path. In some disclosed examples, the mapper is to generate the map to identify a characteristic of the second policy handler. Other disclosed policy handlers include examples where the director is to determine whether the characteristic of the second policy handler satisfies one or more criteria of the unsigned second sub-policy, and forward the global policy to the second policy handler when the characteristic of the second policy handler satisfies the one or more criteria of the unsigned second sub-policy. In some examples, the example characteristic of the second policy handler includes at least one of a functionality type of the second policy handler or a security strength of the second policy handler, and the one or more criteria of the unsigned second policy handler include at least one of a functionality requirement or a minimum security strength. In some examples, the attester is to sign the first sub-policy by appending a private key to the first sub-policy, the private key being unique to the first policy handler. In still other examples, the attester is to sign the global policy when the parser is unable to identify a sub-policy that is capable of enforcement by the first policy handler. In some examples, the parser is to identify the first sub-policy of the global policy by identifying the first sub-policy as an unsigned sub-policy of the global policy. In some other examples, the parser is to determine that the global policy is successfully provisioned in the distributed environment when the global policy includes no unsigned sub-policies. Other examples include a trampoline handler to, in response to a determination that the communication path is an insecure path, generate the secure path from the first policy handler to the second policy handler. In still other examples, the director is to forward the global policy to the second policy handler via a secure path between the first policy handler and the second policy handler.

An example method to manage a global policy in a distributed environment includes identifying, with a processor, a first sub-policy of the global policy that is capable of enforcement by a first policy handler, signing the first sub-policy, determining, with the processor, whether to forward the global policy to a second policy handler based on a signature status of the global policy, and forwarding the global policy to the second policy handler when the signature status of the global policy indicates an unsigned second sub-policy. In some examples, determining whether to forward the global policy includes generating a map identifying the first policy handler and the second policy handler, the map identifying (a) a communication path between the first policy handler and the second policy handler, and (b) a signature of the second policy handler, and forwarding the global policy to the second policy handler when the signature status of the global policy does not include the second policy handler signature identified in the map. In some other examples, the method includes determining whether the communication path identified in the map is a secure path. Some example methods include, in response to determining that the communication path is an insecure path, generating a second secure path between the first policy handler to the second policy handler. Still other example methods include processing the global policy based on additional policy handlers included in the map. In some examples, processing the global policy includes identifying a factor included in a third sub-policy of the global policy, determining whether the map identifies a communication path to a sensor that corresponds to the factor, creating a revised global policy excluding the third sub-policy when the map does not identify the communication path to the sensor, and forwarding the revised global policy to the second policy handler via a secure path. In some example methods, generating the map includes identifying a characteristic of the second policy handler. Other disclosed example methods include determining whether the characteristic of the second policy handler satisfies one or more criteria of the unsigned second sub-policy, and forwarding the global policy to the second policy handler when the characteristic of the second policy handler satisfies the one or more criteria of the unsigned second sub-policy. In some examples, the example characteristic of the second policy handler includes at least one of a functionality type of the second policy handler or a security strength of the second policy handler, and the one or more criteria of the unsigned second policy handler include at least one of a functionality requirement or a minimum security strength. In still other examples, the method includes signing the first sub-policy comprises appending a private key to the first sub-policy, the private key to be unique to the first policy handler. Other example methods include, in response to failing to identify the first sub-policy, signing the global policy. Still other example methods include identifying the first sub-policy of the global policy further comprises identifying the first sub-policy is an unsigned sub-policy of the global policy. In some examples, the method includes determining whether the global policy includes no unsigned sub-policies, and logging the global policy as successfully provisioned in the distributed environment when the global policy includes no unsigned sub-policies. Other examples include methods forwarding the global policy to the second policy handler via a secure path between the first policy handler and the second policy handler. In some other examples, the method includes, in response to determining that the communication path is an insecure path, generating the secure path from the first policy handler to the second policy handler.

An example disclosed computer readable storage medium includes instructions that, when executed, identify a first sub-policy of a global policy that is capable of enforcement by a first policy handler, sign the first sub-policy, determine whether to forward the global policy to a second policy handler based on a signature status of the global policy, and forward the global policy to the second policy handler when the signature status of the global policy is indicative of an unsigned second sub-policy. Some example instructions, when executed, generate a map to identify the first policy handler and the second policy handler, the map to identify (a) a communication path between the first policy handler and the second policy handler, and (b) a signature of the second policy handler, and forward the global policy to the second policy handler when the signature status of the global policy does not include the second policy handler signature identified in the map. In some disclosed example instructions, when executed, cause a machine to determine whether the communication path identified in the map is a secure path. Some example disclosed instructions include, in response to a determination that the communication path is an insecure path, generating a second secure path between the first policy handler to the second policy handler. In some disclosed examples, the instructions, when executed, cause a machine to process the global policy based on a third policy handler included in the map. Some disclosed example instructions identifying a factor included in a third sub-policy of the global policy, determining whether the map identifies a communication path to a sensor that corresponds to the factor, creating a revised global policy excluding the third sub-policy when the map does not identify the communication path to the sensor, and forwarding the revised global policy to the second policy handler via a secure path. In some disclosed examples, instructions include generating the map by identifying a characteristic of the second policy handler. Other disclosed example instructions, when executed, cause a machine to determine whether the characteristic of the second policy handler satisfies one or more criteria of the unsigned second sub-policy, and forward the global policy to the second policy handler when the characteristic of the second policy handler satisfies the one or more criteria of the unsigned second sub-policy. In some examples, the example characteristic of the second policy handler includes at least one of a functionality type of the second policy handler or a security strength of the second policy handler, and the one or more criteria of the unsigned second policy handler includes at least one of a functionality requirement or a minimum security strength. Some example instructions, when executed, append a private key to the first sub-policy, the private key being unique to the first policy handler. Other example instructions include, in response to failing to identify the first sub-policy, signing the global policy. In some example instructions, when executed, cause a machine to determine whether the global policy includes no unsigned sub-policies when the first sub-policy is a signed sub-policy, and log the global policy as successfully provisioned in the distributed environment when the global policy includes no unsigned sub-policies. Some example instructions include generating the secure path from the first policy handler to the second policy handler when the communication path is an insecure path.

An example disclosed system to manage a global policy at a first policy handler in a distributed environment includes means for identifying a first sub-policy of the global policy that is capable of enforcement by the first policy handler, means for signing the first sub-policy, means for determining whether to forward the global policy to a second policy handler based on a signature status of the global policy, and means for forwarding the global policy to the second policy handler when the signature status of the global policy indicates an unsigned second sub-policy. In some examples, the system includes means for generating a map identifying the first policy handler and the second policy handler, the map identifying (a) a communication path between the first policy handler and the second policy handler, and (b) a signature of the second policy handler, and means for forwarding the global policy to the second policy handler when the signature status of the global policy does not include the second policy handler signature identified in the map. In other examples, the system includes means for determining whether the communication path identified in the map is a secure path. Some example systems include, in response to determining that the communication path is an insecure path, means for generating a second secure path between the first policy handler to the second policy handler. Other example systems include means for processing the global policy based on additional policy handlers included in the map. In some example systems, the means for processing the global policy includes means for identifying a factor included in a third sub-policy of the global policy, means for determining whether the map identifies a communication path to a sensor that corresponds to the factor, means for creating a revised global policy excluding the third sub-policy when the map does not identify the communication path to the sensor, and means for forwarding the revised global policy to the second policy handler via the secure path. In some example systems, the means for generating the map includes means for identifying a characteristic of the second policy handler. Other disclosed example systems include means for determining whether the characteristic of the second policy handler satisfies one or more criteria of the unsigned second sub-policy, and means for forwarding the global policy to the second policy handler when the characteristic of the second policy handler satisfies the one or more criteria of the unsigned second sub-policy. In some examples, the example characteristic of the second policy handler includes at least one of a functionality type of the second policy handler or a security strength of the second policy handler, and the one or more criteria of the unsigned second policy handler includes at least one of a functionality requirement or a minimum security strength. In still other example systems, the means for signing the first sub-policy includes means for appending a private key to the first sub-policy, the private key to be unique to the first policy handler. Other example systems include, in response to failing to identify the first sub-policy, means for signing the global policy. In some example systems, the means for identifying the first sub-policy of the global policy includes means for identifying the first sub-policy as an unsigned sub-policy of the global policy. Other example systems include means for determining whether the global policy includes no unsigned sub-policies, and means for logging the global policy as successfully provisioned in the distributed environment when the global policy includes no unsigned sub-policies. In still other examples, systems include means for generating the secure path from the first policy handler to the second policy handler when the communication path is an insecure path.

From the foregoing, it will appreciate that methods, apparatus and articles of manufacture have been disclosed which ensure an MFA policy is satisfied for controlled resource access requests even when, for example, different controlled resources in a client environment may be protected by different policy handlers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first policy handler to provision multi-factor authentication in a distributed computing environment, the distributed computing environment including the first policy handler, a second policy handler and a policy administrator server, the first policy handler to communicate with a resource capable of collecting first authentication factor data, the first policy handler comprising:
   at least one processor to communicate with the resource, the at least one processor to execute:
      a parser responsive to a global multi-factor authentication policy obtained from the policy administrator server via network communication, the parser to identify a first sub-policy of the global multi-factor authentication policy that is capable of enforcement by the first policy handler and not signed by another policy handler, the global multi-factor authentication policy including the first sub-policy, a second sub-policy and a third sub-policy, the parser to sign the first sub-policy to indicate the first policy handler will enforce the first sub-policy; and
      a director to determine at least one of the second sub-policy and the third sub-policy has not been signed by another policy handler, when the at least one of the second and third sub-policies has not been signed by another policy handler, the director to forward the global multi-factor authentication policy to the second policy handler via network communication to continue provisioning of the global multi-factor authentication policy.

2. The first policy handler as defined in claim 1, further including a mapper to:
   generate a map to identify the first policy handler and the second policy handler, the map to identify (a) a communication path between the first policy handler and the second policy handler, and (b) a signature of the second policy handler;
   wherein the director is to process the map and forward the global multi-factor authentication policy to the second policy handler when a signature status of the global multi-factor authentication policy does not include the signature of the second policy handler identified in the map.

3. The first policy handler as defined in claim 2, wherein the director is to determine whether the communication path identified in the map is a secure path.

4. The first policy handler as defined in claim 3, further including a trampoline handler to, in response to a determination that the communication path is an insecure path, generate a second secure path between the first policy handler and the second policy handler.

5. The first policy handler as defined in claim 2, further including an auditor to:
   identify a factor included in the third sub-policy of the global multi-factor authentication policy;
   determine whether the map identifies a communication path to a sensor that corresponds to the factor; and
   create a revised global multi-factor authentication policy excluding the third sub-policy when the map does not identify the communication path to the sensor;
   wherein the director is to forward the revised global multi-factor authentication policy to the second policy handler via a secured path.

6. The first policy handler as defined in claim 2, wherein the mapper is to generate the map to identify a characteristic of the second policy handler.

7. The first policy handler as defined in claim 6, wherein the director is to:
   determine whether the characteristic of the second policy handler satisfies one or more criteria of the unsigned second sub-policy; and
   forward the global multi-factor authentication policy to the second policy handler when the characteristic of the second policy handler satisfies the one or more criteria of the unsigned second sub-policy.

8. The first policy handler as defined in claim 7, wherein the characteristic of the second policy handler includes at least one of a functionality type of the second policy handler or a security strength of the second policy handler, and the one or more criteria of the unsigned second sub-policy include at least one of a functionality requirement or a minimum security strength.

9. A method to provision multi-factor authentication in a distributed computing environment, the distributed computing environment including a first policy handler, a second policy handler and a policy administrator server, the method comprising:
   responsive to a global multi-factor authentication policy received via a network communication from the policy administrator server, identifying, by executing an instruction with at least one processor of the first policy handler, a first sub-policy of the global multi-factor authentication policy that is capable of enforcement by the first policy handler and not signed by another policy handler, the global multi-factor authentication policy including the first sub-policy, a second sub-policy and a third sub-policy;
   electronically signing the first sub-policy with the at least one processor to indicate the first policy handler will enforce the first sub-policy;
   determining, by executing an instruction with the at least one processor, at least one of the second sub-policy and the third sub-policy has not been signed by another policy handler; and
   when the at least one of the second and third sub-policies has not been signed by another policy handler, forwarding, by executing an instruction with the at least one processor, the global multi-factor authentication policy to the second policy handler to continue provisioning of the global multi-factor authentication policy.

10. The method as defined in claim 9, wherein the determining further includes generating a map identifying the first policy handler and the second policy handler, the map identifying (a) a communication path between the first policy handler and the second policy handler, and (b) a signature of the second policy handler, and wherein the forwarding includes forwarding the global multi-factor authentication policy to the second policy handler when a signature status of the global multi-factor authentication policy does not include the signature of the second policy handler identified in the map.

11. The method as defined in claim 10, further including determining whether the communication path identified in the map is a secure path.

12. The method as defined in claim 11, further including, in response to determining that the communication path is an insecure path, generating a second secure path between the first policy handler and the second policy handler.

13. The method as defined in claim 10, further including processing the global multi-factor authentication policy based on additional policy handlers included in the map.

14. The method as defined in claim 13, wherein the processing of the global multi-factor authentication policy further includes:
identifying a factor included in the third sub-policy of the global multi-factor authentication policy;
determining whether the map identifies a communication path to a sensor that corresponds to the factor;
creating a revised global multi-factor authentication policy excluding the third sub-policy when the map does not identify the communication path to the sensor; and
forwarding the revised global multi-factor authentication policy to the second policy handler via a secure path.

15. The method as defined in claim 9, wherein the electronically signing of the first sub-policy includes appending a private key to the first sub-policy, the private key being unique to the first policy handler.

16. The method as defined in claim 9, further including forwarding the global multi-factor authentication policy to the second policy handler via a secure path between the first policy handler and the second policy handler.

17. A machine accessible storage device or storage disk comprising instructions stored thereon that, when executed, cause at least one processor of a first policy handler to at least:
identify, in response to a global multi-factor authentication policy received via a network communication from a policy administrator server, a first sub-policy of the global multi-factor authentication policy that is capable of enforcement by the first policy handler and not signed by another policy handler, the global multi-factor authentication policy including the first sub-policy, a second sub-policy and a third sub-policy;
sign the first sub-policy to indicate the first policy handler will enforce the first sub-policy;
determine at least one of the second sub-policy and the third sub-policy has not been signed by another policy handler; and
when the at least one of the second and third sub-policies has not been signed by another policy handler, forward the global multi-factor authentication policy to a second policy handler to continue provisioning of the global multi-factor authentication policy.

18. The machine accessible storage device or storage disk as defined in claim 17, further including instructions that, when executed, cause the at least one processor to:
generate a map to identify the first policy handler and the second policy handler, the map to identify (a) a communication path between the first policy handler and the second policy handler, and (b) a signature of the second policy handler; and
forward the global multi-factor authentication policy to the second policy handler when a signature status of the global multi-factor authentication policy does not include the signature of the second policy handler identified in the map.

19. The machine accessible storage device or storage disk as defined in claim 18, further including instructions that, when executed, cause the at least one processor to determine whether the communication path identified in the map is a secure path.

20. The machine accessible storage device or storage disk as defined in claim 19, further including instructions that, when executed, cause the at least one processor to, in response to a determination that the communication path is an insecure path, generate a second secure path between the first policy handler to the second policy handler.

* * * * *